(12) United States Patent
Matsumura et al.

(10) Patent No.: US 11,601,160 B2
(45) Date of Patent: Mar. 7, 2023

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP); Lihui Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 34 days.

(21) Appl. No.: 16/764,380

(22) PCT Filed: Nov. 16, 2017

(86) PCT No.: PCT/JP2017/041377
§ 371 (c)(1),
(2) Date: May 14, 2020

(87) PCT Pub. No.: WO2019/097658
PCT Pub. Date: May 23, 2019

(65) Prior Publication Data
US 2020/0280338 A1    Sep. 3, 2020

(51) Int. Cl.
*H04B 1/7143* (2011.01)
*H04W 72/04* (2009.01)
(Continued)

(52) U.S. Cl.
CPC ...... *H04B 1/7143* (2013.01); *H04W 72/0413* (2013.01); *H04W 72/0446* (2013.01); *H04W 80/08* (2013.01)

(58) Field of Classification Search
CPC ...... H04B 1/7143; H04B 1/715; H04B 1/713; H04W 72/0413; H04W 72/0446;
(Continued)

(56) References Cited

U.S. PATENT DOCUMENTS

| 2011/0007779 | A1  | 1/2011 | Nanri |
| 2014/0169316 | A1* | 6/2014 | Kim ...................... H04L 5/0048 370/329 |

(Continued)

FOREIGN PATENT DOCUMENTS

| CN | 101183896 A | 5/2008 |
| CN | 102449921 A | 5/2012 |
| WO | 2009/116247 A1 | 9/2009 |

OTHER PUBLICATIONS

3GPP TSG RAN WG1 Meeting 89bis; R1-1708314; "Structure of PUCCH in long-duration;", Cohere Technologies; May 13-20, 2017; Hangzhou, China (5 Pages) (Year: 2017).*

(Continued)

*Primary Examiner* — Ayaz R Sheikh
*Assistant Examiner* — Tarell A Hampton
(74) *Attorney, Agent, or Firm* — Osha Bergman Watanabe & Burton LLP

(57) ABSTRACT

The present invention is designated to appropriately control inter-slot frequency hopping of an uplink channel/signal. A user terminal of the present invention includes a transmitting section that transmits an uplink control channel over a plurality of slots and a control section that controls frequency hopping of the uplink control channel between the plurality of slots.

4 Claims, 20 Drawing Sheets

(51) Int. Cl.
*H04W 80/08* (2009.01)
*H04W 72/0446* (2023.01)

(58) Field of Classification Search
CPC .... H04W 80/08; H04L 1/1861; H04L 5/0082; H04L 5/0053; H04L 5/0012; H04L 1/1893
See application file for complete search history.

(56) References Cited

U.S. PATENT DOCUMENTS

| | | | |
|---|---|---|---|
| 2014/0241188 A1* | 8/2014 | Park | H04L 27/2613 370/252 |
| 2015/0055618 A1 | 2/2015 | Takaoka et al. | |
| 2018/0295651 A1* | 10/2018 | Cao | H04W 74/0833 |
| 2018/0323932 A1* | 11/2018 | Huang | H04B 1/713 |
| 2019/0109732 A1* | 4/2019 | Choi | H04L 1/00 |
| 2019/0190669 A1* | 6/2019 | Park | H04B 7/0456 |
| 2020/0221394 A1* | 7/2020 | Yoshimura | H04W 52/325 |
| 2020/0228289 A1* | 7/2020 | He | H04L 5/0064 |
| 2020/0235881 A1* | 7/2020 | Choi | H04W 72/04 |

OTHER PUBLICATIONS

3GPP TSG RAN WG1 Meeting NR#3; R1-1715514 "Support of long-PUCCH transmission over multiple slots" Spreadtrum Communications; Nagoya, Japan; Sep. 18-21, 2017 (4 pages).
3GPP TSG RAN WG1 Meeting #90; R1-1712581 "Long PUCCH over multiple slots" Intel Corporation; Prague, P. R. Czechia; Aug. 21-25, 2017 (5 pages).
3GPP TSG RAN WG1 Meeting 90bis; R1-1717961 "Support of long PUCCH over multiple slots for NR" LG Electronics; Prague, CZ; Oct. 9-13, 2017 (7 pages).
3GPP TSG RAN WG1 Meeting #89; R1-1707396 "Time and frequency domain resource allocation for long PUCCH" Intel Corporation; Hangzhou, P. R. China; May 15-19, 2017 (5 pages).
Extended European Search Report issued in European Application No. 17932372.0, dated Jun. 10, 2021 (11 pages).
International Search Report issued in Application No. PCT/JP2017/041377, dated Feb. 6, 2018 (5 pages).
Written Opinion issued in International Application No. PCT/JP2017/041377, dated Feb. 6, 2018 (5 pages).
3GPP TS 36.300 V8.12.0, Release 8; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2;" Mar. 2010; Sophia Antipolis Valbonne, France (149 pages).
3GPP TSG RAN WG1 Meeting 90bis; R1-1718210; "Long-PUCCH for UCI of up to 2 bits;" NTT DOCOMO, Inc.; Oct. 9-13, 2017; Prague, Czech Republic (11 pages).
3GPP TSG RAN WG1 Meeting 90bis; R1-1718730; "Considerations on frequency hopping for PUCCH;" KT Corp.; Oct. 9-13, 2017; Prague, Czech Republic (2 pages).
3GPP TSG RAN WG1 Meeting 90bis; R1-1717749; "Considerations on PUCCH resource allocation for NR;" Spreadtrum Communications; Oct. 9-13, 2017; Prague, Czech Republic (4 pages).
3GPP TSG RAN WG1 Meeting 90bis; R1-1718214; "Resource allocation for PUCCH;" NTT DOCOMO, Inc.; Oct. 9-13, 2017; Prague, Czech Republic (11 pages).
Office Action issued in counterpart Chinese Application No. 201780098168.2 dated Jun. 25, 2021 (18 pages).
Office Action issued in counterpart Chinese Application No. 201780098168.2 dated Feb. 23, 2022 (13 pages).
Office Action issued in counterpart Indian Application No. 202037025159 dated Mar. 25, 2022 (6 pages).
Office Action issued in Australian Application No. 2017440171; dated Oct. 17, 2022 (3 pages).

* cited by examiner

| PUCCH FORMAT | NUMBER OF SYMBOLS | NUMBER OF BITS |
|---|---|---|
| 0 | 1-2 | ≤2 |
| 1 | 4-14 | ≤2 |
| 2 | 1-2 | >2 |
| 3 | 4-14 | >N |
| 4 | 4-14 | >2, <N |

FIG. 2

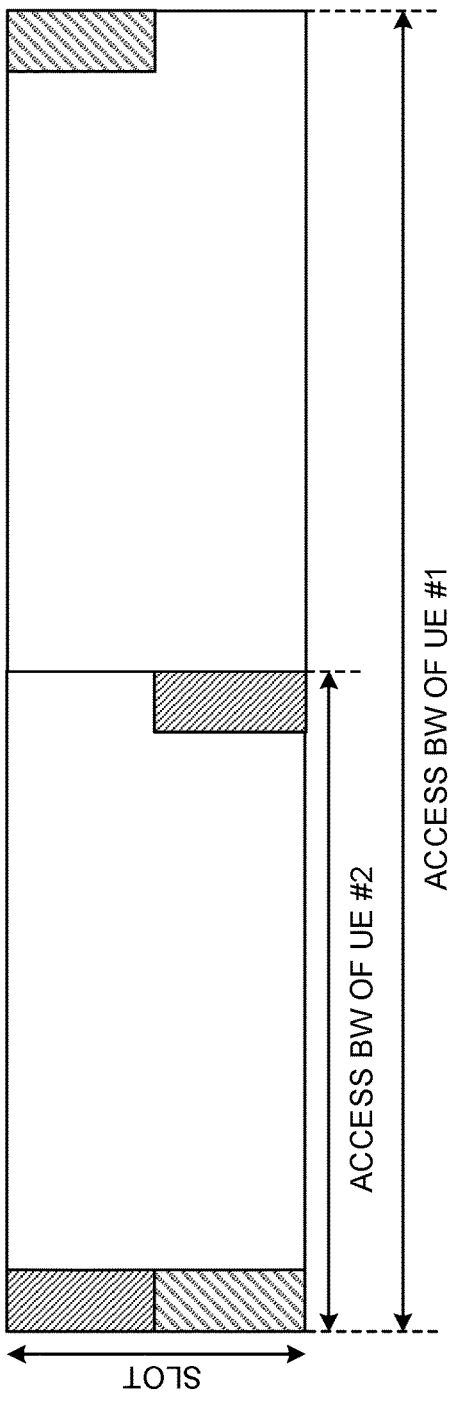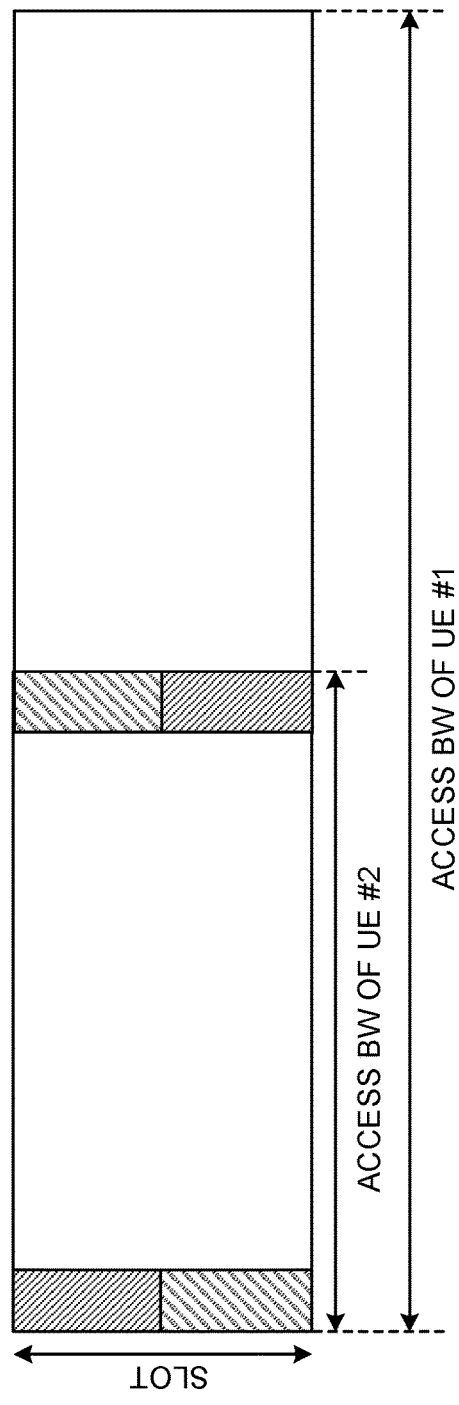

FIG. 7A
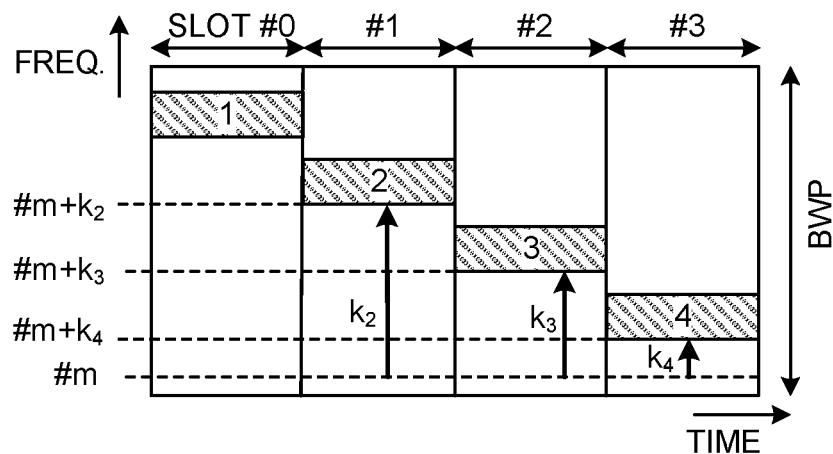
FIG. 7B
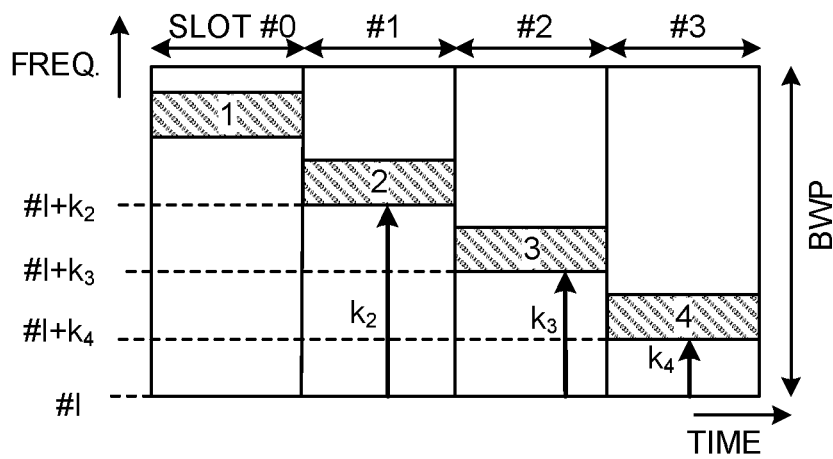
 PUCCH/PUSCH

FIG. 12A

| VALUE OF PREDETERMINED FIELD IN DCI | PUCCH RESOURCE SET |
|---|---|
| 00 | PUCCH RESOURCE SET #0 |
| 01 | PUCCH RESOURCE SET #1 |
| 10 | PUCCH RESOURCE SET #2 |
| 11 | PUCCH RESOURCE SET #3 |

FIG. 12B

GROUP OF PARAMETERS INCLUDED IN EACH PUCCH RESOURCE SET

| |
|---|
| STARTING SYMBOL |
| NUMBER OF SYMBOLS IN SLOT |
| INDEX IDENTIFYING FIRST-HOP FREQUENCY RESOURCE |
| NUMBER OF PRBS |
| ENABLING FREQUENCY HOPPING OR NOT |
| INFORMATION RELATED TO FREQUENCY RESOURCES FOR SECOND AND SUBSEQUENT HOPS |
| FREQUENCY HOPPING MODE FOR PLURALITY OF SLOTS |

INFORMATION INCLUDED IN DCI

| |
|---|
| STARTING SYMBOL |
| NUMBER OF SYMBOLS IN SLOT |
| INFORMATION (c) OF FREQUENCY RESOURCE ALLOCATION FOR PUSCH |
| (a) ENABLING FREQUENCY HOPPING OR NOT |
| INFORMATION (b) RELATED TO FREQUENCY RESOURCES FOR SECOND AND SUBSEQUENT HOPS |
| (d) MODE OF FREQUENCY HOPPING FOR PLURALITY OF SLOTS |

RESOURCE ALLOCATION FIELD OF X-BIT

| (a) | (b)+(c) |
|---|---| ceil [log (Y RBs* (Y RBs+1))] BITS          Z BITS

FIG. 14B

| Z=1 | (b)+(c) |
|---|---|
| 0 | 0 (NO HOPPING) |
| 1 | 1/2 * S |

FIG. 14C

| Z=2 | (b)+(c) |
|---|---|
| 00 | 0 (NO HOPPING) |
| 01 | 1/2 * S |
| 10 | (+1/4) * S |
| 11 | (−1/4) * S |

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of Long-Term Evolution (LTE) have been drafted for the purpose of further increasing high speed data rates, providing lower latency, and so on (see non-patent literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+(plus)," "NR (New RAT)," "LTE Rel. 14," "LTE Rel. 15 (or later versions)," and so on).

In existing LTE systems (for example, LTE Rel. 8 to Rel. 13), downlink (DL) and/or uplink (UL) communications are carried out using 1 ms subframes (referred to as, for example, "transmission time intervals (TTIs)"). This subframe is the unit of time to transmit one data packet that is channel-encoded, and is the processing unit in scheduling, link adaptation, retransmission control (HARQ (Hybrid Automatic Repeat reQuest), and so on.

In existing LTE systems (for example, LTE Rel. 8 to Rel. 13), a user terminal transmits uplink control information (UCI) by using an uplink control channel (for example, PUCCH (Physical Uplink Control Channel)) or an uplink data channel (for example, PUSCH (Physical Uplink Shared Channel)). A structure (format) of the uplink control channel is referred to as a "PUCCH format (PF)," for example.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, LTE Rel. 14, LTE Rel. 15 or later versions, 5G, NR, and so on), a study is underway to adopt an uplink channel and/or an uplink signal (uplink channel/signal) (at least one of, for example, an uplink control channel (PUCCH), an uplink data channel (PUSCH), a sounding reference signal (SRS), and so on) over a plurality of slots. In addition, a study is underway to employ frequency hopping which causes frequency resources to which the uplink channel/signal is to be mapped to hop between the plurality of slots (inter-slot frequency hopping).

Here, an access BW may be also referred to as a "carrier (component carrier (CC) or a system band)," or a "partial frequency band in the carrier (partial band)" or a "bandwidth part (BWP)", and so on.

It is desired to appropriately control, in the future radio communication systems in which different access BWs may thus be configured for a plurality of user terminals, a pattern of inter-slot frequency hopping for an uplink channel/signal (positions of frequency resources for hopping and/or hopping timing (hopping boundary) and so on).

The present invention has been made in view of the above, and it is therefore an object of the present invention to provide a user terminal and a radio communication method, whereby inter-slot frequency hopping of an uplink channel/signal can be controlled appropriately.

Solution to Problem

An aspect of a user terminal of the present invention includes a transmitting section that transmits an uplink control channel over a plurality of slots and a control section that controls frequency hopping of the uplink control channel between the plurality of slots.

Advantageous Effects of Invention

According to the present invention, it is possible to appropriately control inter-slot frequency hopping for an uplink channel/signal.

BRIEF DESCRIPTION OF DRAWINGS

FIG. 2 is a diagram to show an example of PUCCH formats in the future radio communication system;

FIGS. 3A and 3B are diagrams to show examples of intra-slot frequency hopping of a PUCCH;

FIGS. 7A and 7B are diagrams to show modification examples of a frequency offset when inter-slot frequency hopping according to the first aspect is employed;

FIGS. 12A and 12B are diagrams to show an example of PUCCH resource sets according to a fourth aspect;

FIG. 13 is a diagram to show an example of DCI according to a fifth aspect;

FIGS. 14A to 14C are diagrams to show examples of a joint field in the DCI according to the fifth aspect;

DESCRIPTION OF EMBODIMENTS

Existing LTE systems (LTE Rel. 13 or former versions) supports uplink control channels (for example, PUCCHs) of a plurality of formats (for example, LTE PUCCH formats (LTE PFs) 1 to 5 and so on) for the same duration (for example, 14 symbols in a normal cyclic prefix (CP)).

In future radio communication systems (for example, LTE Rel. 15 or later versions, 5G, NR, and so on), a study is underway to transmit UCI by using uplink control channels (for example, PUCCHs) of a plurality of formats (for example, NR PUCCH formats (NR PFs), also referred to simply as PUCCH formats) different from each other at least in period.

Figure 1:
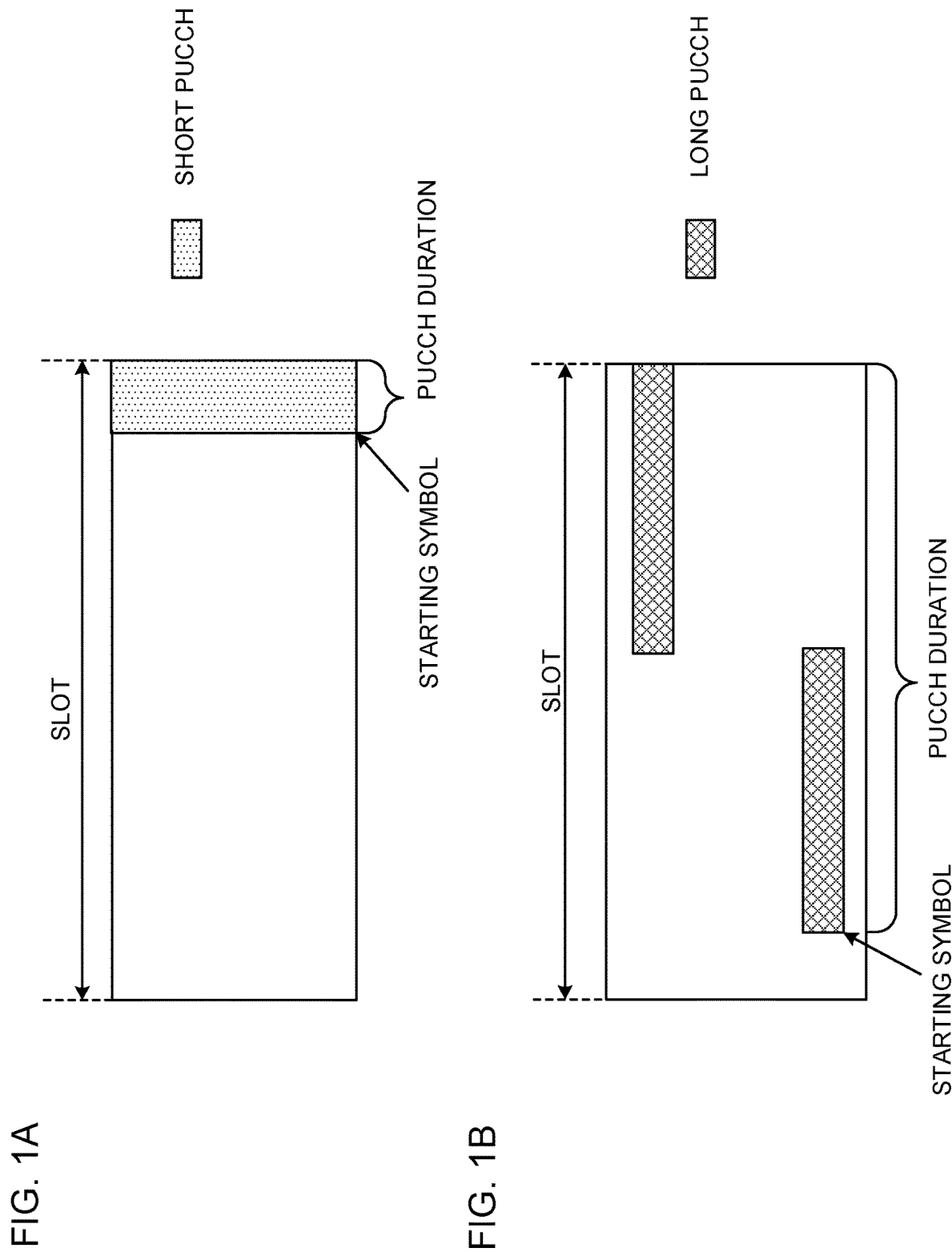
FIGS. 1A and 1B are diagrams to show examples of a PUCCH in a future radio communication system.

FIG. 1 illustrates diagrams to show examples of a PUCCH in a future radio communication system. FIG. 1A shows a PUCCH (a short PUCCH or first uplink control channel) constituted of a relatively small number of symbols (duration, for example, one to two symbols). FIG. 1B shows a PUCCH (a long PUCCH or second uplink control channel) constituted of a larger number of symbols (duration, for example, 4 to 14 symbols) than that of the short PUCCH.

As shown in FIG. 1A, the short PUCCH may be mapped to a predetermined number of symbols (for example, one to two symbols) (PUCCH duration) from the end of a slot. Note that the symbols to which the short PUCCH is mapped are not limited to those at the end of the slot but may be the predetermined number of symbols at the start of or in the middle of the slot. The start position of the short PUCCH in the time direction in the slot may be indicated by an index of a starting symbol.

In addition, the short PUCCH is mapped to one or more frequency resources (for example, one or more PRBs). Note that it is assumed in FIG. 1A that the short PUCCH is mapped to consecutive PRBs, but the short PUCCH may be mapped to nonconsecutive PRBs.

Alternatively, the short PUCCH may be time-division-multiplexed and/or frequency-division-multiplexed with an uplink data channel (hereinafter also referred to as a "PUCCH") in the slot. Furthermore, the short PUCCH may be time-division-multiplexed and/or frequency-division-multiplexed with a downlink data channel (hereinafter also referred to as a "PDCCH") and/or a downlink control channel (hereinafter also referred to as a "PDCCH (Physical Downlink Control Channel)") in the slot.

The short PUCCH may use a multi-carrier waveform (for example, an OFDM (Orthogonal Frequency Division Multiplexing) waveform) or may use a single-carrier waveform (for example, a DFT-s-OFDM (Discrete Fourier Transform-Spread-Orthogonal Frequency Division Multiplexing) waveform).

The format of the short PUCCH may be, for example, PUCCH format (PF) 0 or 2. The format of the short PUCCH may vary depending on to the number of bits of the UCI (for example, whether up to 2 bits or more than 2 bits). For example, PUCCH format 0 may be used for the UCI of up to 2 bits, while PUCCH format 2 may be used for UCI of more than 2 bits (see FIG. 2).

Meanwhile, as shown in FIG. 1B, the long PUCCH may be mapped over a larger number of symbols (for example, 4 to 14 symbols) (PUCCH duration) than that of the short PUCCH. In FIG. 1B, the long PUCCH is not mapped to a predetermined number of symbols at the starting of the slot but may be mapped to the predetermined number of symbols at the start. The starting position of the long PUCCH in the time direction in the slot may be indicated by an index of a starting symbol.

As illustrated in FIG. 1B, to obtain a power boosting effect, the long PUCCH may be constituted of a smaller number of frequency resources (for example, one or two PRBs) than that of the short PUCCH or may be constituted of the equal number of frequency resources to that of the short PUCCH.

The long PUCCH may be frequency-division-multiplexed with a PUSCH in the slot. The long PUCCH may be time-division-multiplexed with a PDCCH in the slot. The long PUCCH may be mapped to the same slot as that of the short PUCCH. The long PUCCH may use a single-carrier waveform (for example, a DFT-s-OFDM waveform or a CAZAC (Constant Amplitude Zero Auto Correlation) sequence (for example, an OFDM waveform using a CGS (Computer Generated Sequence) or a Zhadoff-chu sequence)) for a reference sequence of a transmission signal or may use a multi-carrier waveform (for example, an OFDM waveform).

The format of the long PUCCH may be, for example, PUCCH format (PF) 1, 3 or 4. The format of the long PUCCH may vary depending on to the number of bits of the UCI (for example, whether up to 2 bits or more than 2 bits). For example, PUCCH format 1 may be used for UCI of up to 2 bits, while PUCCH format 3 or 4 may be used for UCI of more than 2 bits (see FIG. 2).

Furthermore, the format of the long PUCCH may be controlled based on the number N of bits of the UCI. For example, PUCCH format 3 may be used for UCI of more than N bits (or N bits or more), while PUCCH format 4 may be used for UCI of up to N bits (or less than N bits) and more than 2 bits (see FIG. 2).

Note that FIG. 2 is merely an example, and N may be N=2 or may be N>2. Alternatively, in FIG. 2, N of different values may be used for PUCCH format 3 and PUCCH format 4. For example, N=2 may be used for PUCCH format 3, while N=100 may be used for PUCCH format 4.

Furthermore, the format of the long PUCCH may vary depending on whether or not to employ block-wise spreading before DFT (for example, block-wise spreading in a time domain using orthogonal cover code (OCC)). For example, PUCCH format 3 may be used in the case of not employing block-wise spreading before DFT, while PUCCH format 4 may be used in the case of employing block-wise spreading before DFT. Note that, in PUCH format 1 or/and 4, block-wise spreading after DFT (for example, block-wise spreading in the time domain using OCC) may be employed.

Furthermore, as shown in FIG. 1B, frequency hopping in which frequency resource hops at a predetermined timing in one slot (intra slot frequency hopping) may be employed on the long PUCCH. Although not shown, similar intra-slot frequency hopping may also be employed on the short PUCCH and/or PUSCH constituted of a plurality of symbols.

FIG. 3 illustrates diagrams to show examples of intra-slot frequency hopping of a PUCCH (for example, a long PUCCH). Note that, although a long PUCCH is illustrated as an example of a PUCCH in FIGS. 3A and 3B, the intra-slot frequency hopping can be similarly employed on other uplink channels/signals, such as a short PUCCH, a PUSCH, and an SRS.

As shown in FIGS. 3A and 3B, in the above-described future radio communication system, an accessible bandwidth (access BW (bandwidth)) may be configured for each user terminal. Here, the access BW may be also referred to as a "carrier (component carrier (CC) or a system band)," or a "partial frequency band in the carrier (partial band)" or a "bandwidth part (BWP)"), and so on.

For example, in FIGS. 3A and 3B, an access BW of user terminal #1 is configured to be wider than an access BW of user terminal #2. The distance (offset) between frequency resources to which PUCCHs are mapped may be different (FIG. 3A) or may be the same (FIG. 3B) for user terminals #1 and #2 having different access BWs.

In addition, in the above-described future radio communication system, a study is underway to enable UCI transmission using a long PUCCH over a plurality of slots. FIG. 4 illustrates diagrams to show examples of a long PUCCH over a plurality of slots. Note that, although a long PUCCH is illustrated in FIG. 4, these examples are similarly applicable to other uplink channels/signals, such as a PUSCH and an SRS.

Figure 4A:
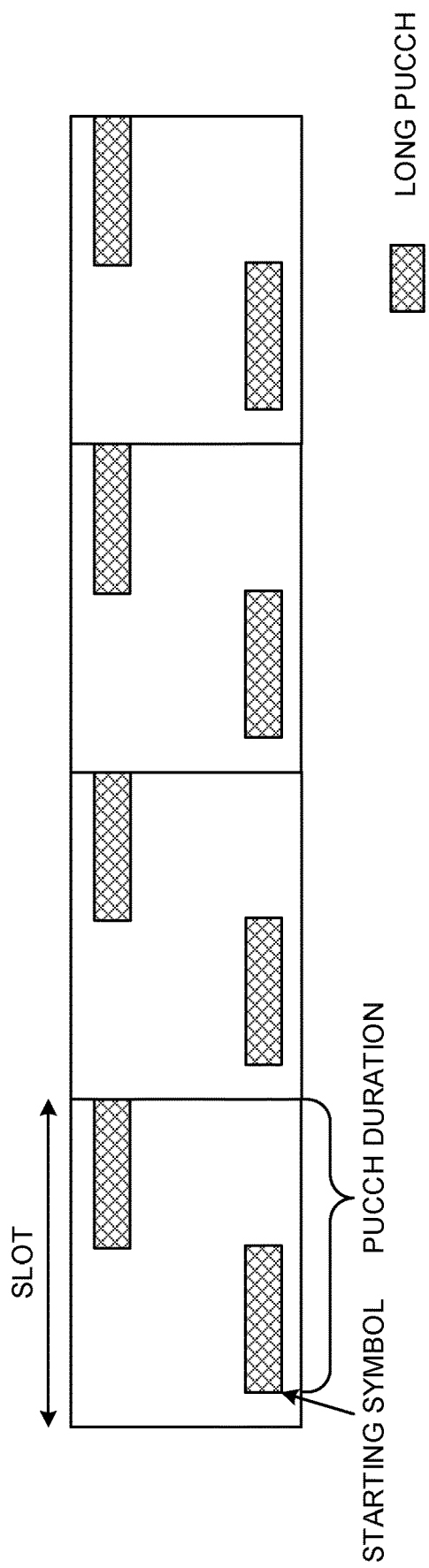
FIGS. 4A and 4B are diagrams to show examples of a long PUCCH over a plurality of slots.
Figure 4B:
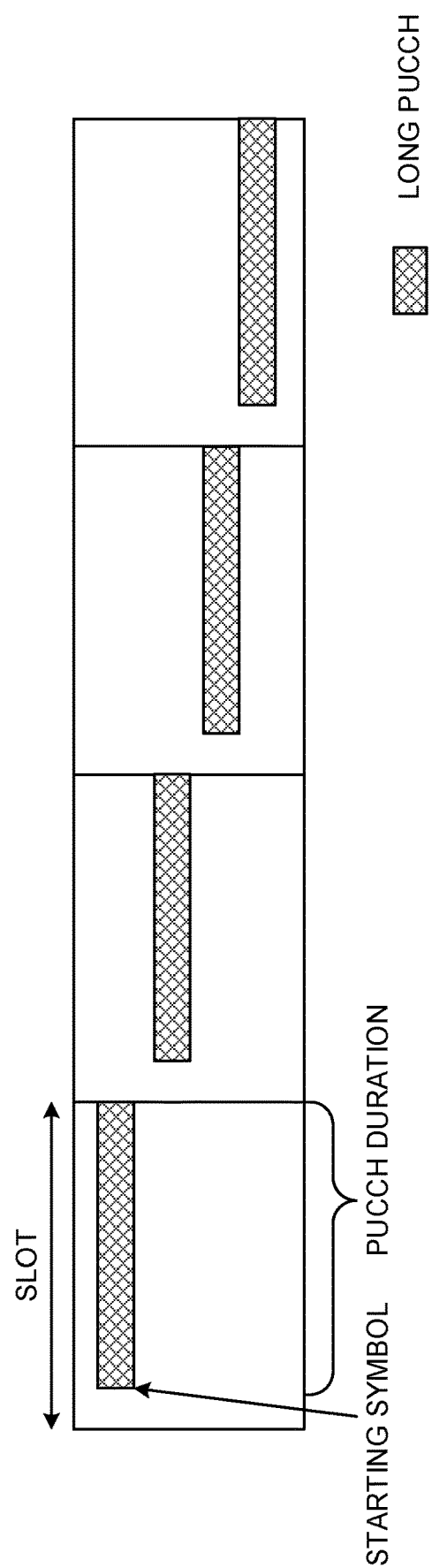

As shown in FIGS. 4A and 4B, in the case of the long PUCCH over a plurality of slots, the slots may have the same duration (PUCCH duration) and/or starting symbol of the long PUCCH. Note that, although not illustrated, the slots may have different PUCCH durations and/or starting symbols.

As shown in FIG. 4A, intra-slot frequency hopping may be employed on the long PUCCH over a plurality of slots in each slot. Alternatively, as shown in FIG. 4B, for the long PUCCH over a plurality of slots, frequency hopping which causes frequency resources to which the long PUCCH is mapped to hop between the plurality of slots (inter-slot frequency hopping) may be employed.

Note that intra-slot frequency hopping (FIG. 4A) and inter-slot frequency hopping (FIG. 4B) are not simultaneously employed for the same user terminal in the long PUCCH over a plurality of slots.

As described above, in the future radio communication system (for example, LTE Rel. 15 or later versions, 5G, NR, and so on), it is assumed that the access BW may be different for each user terminal (for example, FIG. 2). Hence, it is desired to flexibly control, for each user terminal, a pattern of inter-slot frequency hopping (for example, positions of frequency resources for hopping and/or hopping timings and so on) of an uplink channel/signal (for example, at least one of the above-described long PUCCH, short PUCCH, PUSCH, SRS, and so on).

In view of this, the inventors of the present invention studied a method for flexibly controlling a pattern of inter-slot frequency hopping of an uplink channel/signal and reached the present invention.

Hereinafter, the present embodiment will be described in detail. In the following, a description will be given mainly of a PUCCH and/or a PUSCH (PUCCH/PUSCH) as an example of an uplink channel/signal. However, the present embodiment is also applicable to other uplink channels and/or uplink signals, such as an SRS. In addition, "PUCCH" is hereinafter used as a general term for a long PUCCH and/or a short PUCCH.

(First Aspect)

In a first aspect, a description will be given of frequency resources to which a PUCCH/PUSCH is to be mapped, when inter-slot frequency hopping is employed on a PUCCH/PUSCH over a plurality of slots, and reporting of information related to the frequency resources.

When inter-slot frequency hopping is employed on a PUCCH/PUSCH over a plurality of slots, frequency resources to which the PUCCH/PUSCH is to be mapped may hop every predetermined number of slots. The number M of slots (the number of hopping slots) for the frequency resources for the PUCCH/PUSCH to hop may be determined based on the number of slots to which the PUCCH/PUSCH is allocated or may be specified through higher layer signaling and/or by DCI.

FIG. 5 illustrates diagrams to show examples of inter-slot frequency hopping according to the first aspect. FIGS. 5A to 5D show examples of inter-slot frequency hopping employed on a PUCCH/PUSCH over a plurality of slots. Note that FIGS. 5A to 5D merely illustrate examples and the number of slots and/or the number M of hopping slots to which the PUCCH/PUSCH is to be mapped is not limited to those illustrated in FIGS. 5A to 5D. In FIGS. 5A to 5D, a frequency resource of each hop is constituted of a predetermined number of resource units (for example, one or more PRBs or REs).

Figure 5A:
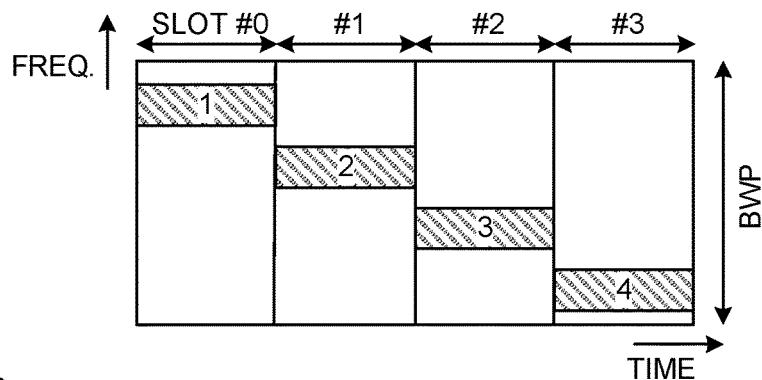
FIGS. 5A to 5D are diagrams to show examples of inter-slot frequency hopping according to a first aspect.
Figure 5B:
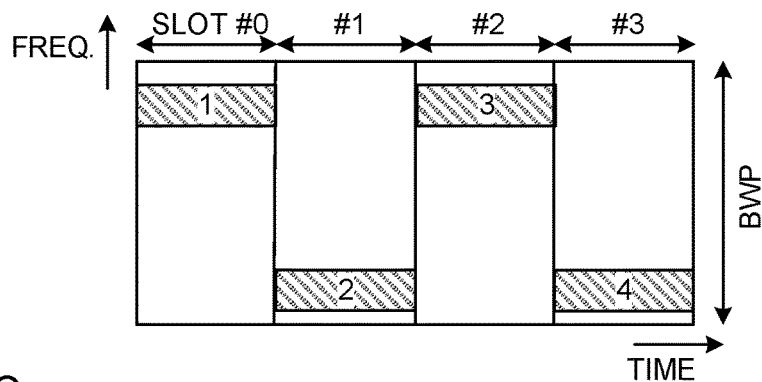

For example, in FIGS. 5A and 5B, frequency resources for the PUCCH/PUSCH hop in every single slot. As shown in FIG. 5A, the PUCCH/PUSCH over a plurality of slots may be mapped to a different frequency resource in each slot. Alternatively, as shown in FIG. 5B, the PUCCH/PUSCH over a plurality of slots may be mapped to the same frequency resource every predetermined number of slots (here, two slots).

Note that, in FIG. 5A, the bandwidth of the frequency resource of each hop may be calculated based on a BWP and the number of slots for the PUCCH/PUSCH. In FIG. 5B, the bandwidth between the frequency resources of each two hops may be calculated based on the BWP (for example, by multiplying the BWP by a predetermined coefficient).

Figure 5C:
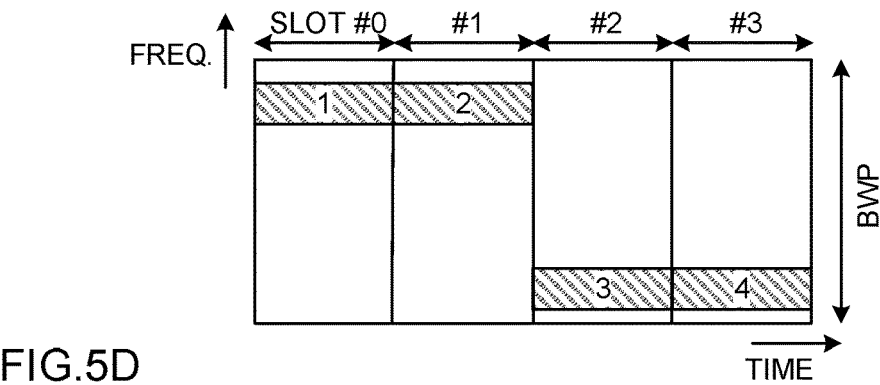

In FIG. 5C, frequency resources for the PUCCH/PUSCH over a plurality of slots hop only once. In FIG. 5C, the number of hopping slots may be determined based on the number of slots allocated to the PUCCH/PUSCH divided by two (the number of slots/2).

Figure 5D:
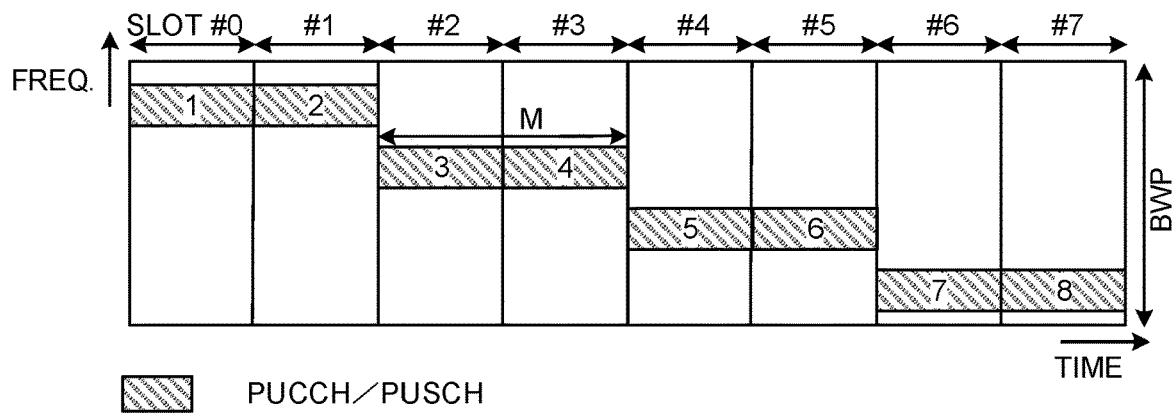

In FIG. 5D, the frequency resources for the PUCCH/PUSCH hop every M hopping slots, the number M of hopping slots being determined based on the number of slots allocated to the PUCCH/PUSCH. The number M of hopping slots may be determined by using a table (for example, Table 1, below) associating the number M of hopping slots and the number of slots for the PUCCH/PUSCH with each other.

For example, in FIG. 5D, the number of slots allocated to the PUCCH/PUSCH of the user terminal is eight, and thus the user terminal may determine the number M of hopping slots to be "2" corresponding to the number of slots for a PUCCH/PUSCH "8", by using Table 1 below.

TABLE 1

| M | Number of slots for PUCCH/PUSCH |
|---|---|
| 1 | 1 to 4 |
| 2 | 5 to 8 |
| 3 | 9 to 12 |
| 4 | 13 to 16 |
| ... | ... |

In FIG. 5D, when a slot index starts from 0, a hopping boundary may be calculated from immediately after n*M−1 slot (where n=1, 2, . . . ceil(N/M)). Here, M may be determined depending on the number of slots allocated to the PUCCH/PUSCH as described above. Alternatively, M may be configured through higher layer signaling. N may be the number of slots allocated to the PUCCH/PUSCH.

In the first aspect, when inter-slot frequency hopping is employed on a PUCCH/PUSCH over a plurality of slots, a radio base station may report to a user terminal about information related to frequency resources to which the PUCCH/PUSCH is to be mapped (frequency resource information).

Here, the frequency resource information may include information indicating an index of certain frequency resource (for example, a first-hop (starting) frequency resource) (for example, an index of a PRB and/or a resource element (RE) (PRB/RE)) and information related to other frequency resources (for example, second- and subsequent-hop frequent resources). The information related to the other frequency resources may be, for example, information indicating a predetermined frequency offset (frequency offset information) or information indicating indices of the other frequency resources.

FIG. 6 illustrates diagrams to show examples of a frequency offset when inter-slot frequency hopping according to the first aspect is employed. In FIGS. 6A to 6D, cases of employing inter-slot frequency hopping in a BWP configured for a user terminal are illustrated. However, the bandwidth for which the inter-slot frequency hopping is employed is not limited to the BWP as long as being an access BW of the user terminal.

In FIGS. 6A to 6D, the user terminal is assumed to be reported about index # n (for example, the smallest index) of a predetermined resource unit (for example, PRB/RE) of the first-hop frequency resource.

Figure 6A:
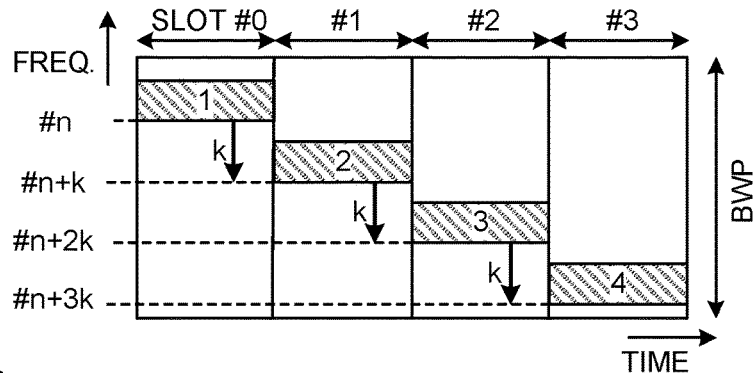
FIGS. 6A to 6D are diagrams to show examples of a frequency offset when the inter-slot frequency hopping according to the first aspect is employed.
Figure 6B:
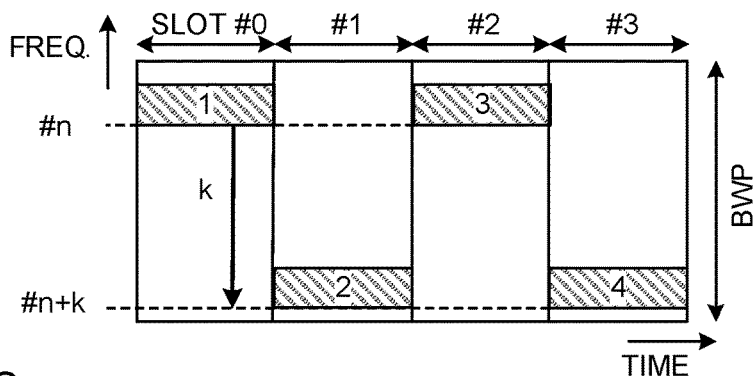

For example, as illustrated in FIGS. 6A and 6B, the radio base station may report to the user terminal about frequency offset information indicating frequency offset k from the previous-hop (previous-slot) frequency resource, when frequency resources for the PUCCH/PUSCH hop every single slot.

In FIG. 6A, the user terminal may determine index # n+k (for example, the smallest PRB index or RE index) of the next-slot frequency resource (for example, the second-hop (slot #1) frequency resource), based on an addition result of index # n of the previous-hop frequency resource (for example, the first-hop (slot #0) frequency resource) and frequency offset k (k=integer).

In FIG. 6B, the user terminal may determine index # n+k or #(n+k)-k (for example, the smallest PRB index or RE index) of each subsequent-hop frequency resource (for example, a frequency resource in each of the second, third, and fourth hops (slots #1, #2, and #3)) based on an addition result of or a subtraction result of the previous-hop frequency resource (for example, index # n of the first-hop (slot #0) frequency resource) and frequency offset k (k=integer).

Figure 6C:
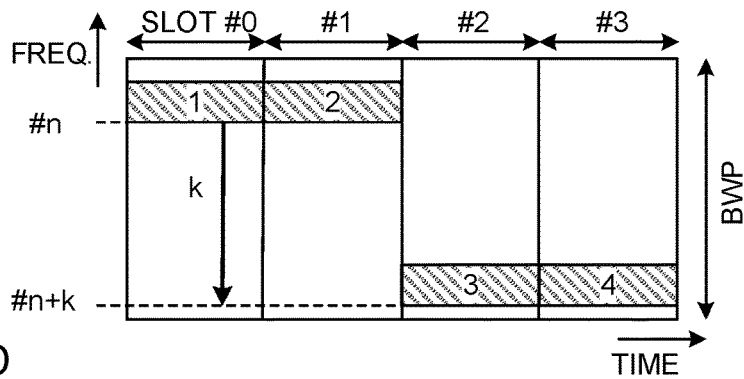

As illustrated in FIG. 6C, when the frequency resources for the PUCCH/PUSCH hop only once, the radio base station may report to the user terminal about frequency offset information indicating frequency offset k from the first-hop frequency resource.

In FIG. 6C, the user terminal may determine index # n+k (for example, the smallest PRB index or RE index) of the second-hop frequency resource, based on an addition result of index # n of the first-hop frequency resource and frequency offset k (k=integer).

Figure 6D:
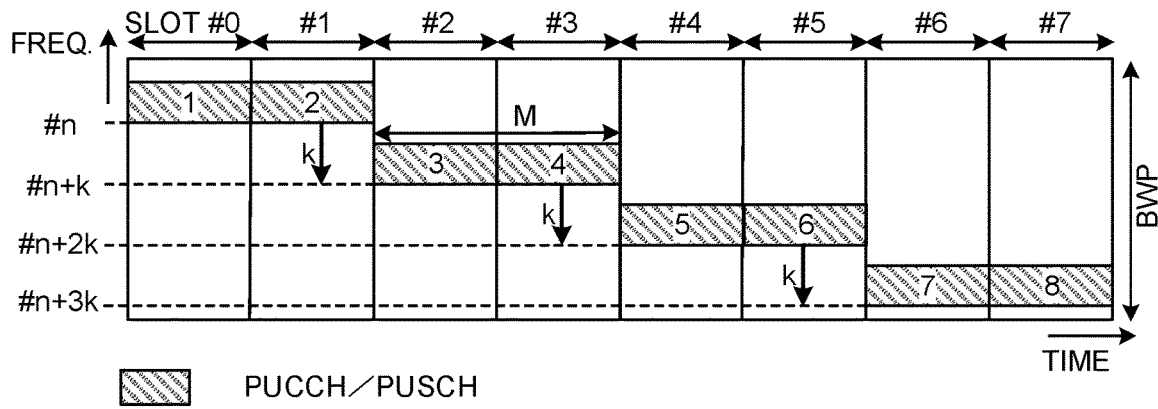

As illustrated in FIG. 6D, when the frequency resources for the PUCCH/PUSCH hop every M hopping slots, the radio base station may report to the user terminal about frequency offset information indicating frequency offset k from the previous-hop frequency resource.

In FIG. 6D, the user terminal may determine an index (for example, the smallest index # n+k of PRB or RE) of the next-hop frequency resource, based on an addition result of the index of the previous-hop frequency resource (for example, the smallest index # n of PRB index or RE) and frequency offset k (k=integer).

The description has been given above of examples, in FIGS. 6A to 6D, in which the radio base station reports to the user terminal about frequency offset information indicating frequency offset k from the previous-hop frequency resource. However, frequency offset k is not limited thereto. FIG. 7 illustrates diagrams to show modification examples of a frequency offset when inter-slot frequency hopping according to the first aspect is employed. Note that although FIGS. 7A and 7B illustrate modification examples of frequency offset k by using, as an example, the pattern of the inter-slot frequency hopping in FIG. 6A, the modification examples are also applicable to FIGS. 6B to 6D.

In FIG. 7A, the radio base station reports to the user terminal about frequency offset information indicating frequency offset $k_i$ of an i-th (i=2 to 4 in FIG. 7A) hop from index # m of a frequency resource used as a reference (reference frequency resource). The user terminal may be reported about (configured with) the information indicating index # m through higher layer signaling. In FIG. 7A, the user terminal may determine index ft+$k_i$ (for example, the smallest PRB index or RE index) of the i-th-hop frequency resource, based on index # m of the reference frequency resource and frequency offset $k_i$ ($k_i$=integer) for the i-th hop.

In FIG. 7B, the radio base station reports to the user terminal about frequency offset information indicating frequency offset $k_i$ of an i-th (i=2 to 4 in FIG. 7B) hop from index #1 (for example, a PRB or RE index) of an edge of the access BW (here, BWP) of the user terminal. Index #1 may be an index (for example, a PRB index or RE index) of the opposite edge of the access BW from that of the first-hop frequency resource.

In FIG. 7B, the user terminal may determine index #1+$k_i$ (for example, the smallest PRB index or RE index) of the i-th-hop frequency resource, based on index #1 of the edge of the access BWP and frequency offset $k_i$ ($k_i$=integer).

FIG. 8 illustrates diagrams to show examples of multiplexing of a plurality of user terminals in the case of employing the inter-slot frequency hopping according to the first aspect. FIG. 8A illustrates a case where a first-hop frequency resource for user terminal #2 is the same as a second-hop frequency resource for user terminal #1. In FIG. 8A, an i-th-hop frequency resource (i=2 to 4 in FIG. 8A) for each of user terminals #1 and #2 is determined based on frequency offset k and the index of the (i−1)-th-hop frequency resource similar to those in FIG. 6A.

Figure 8A:
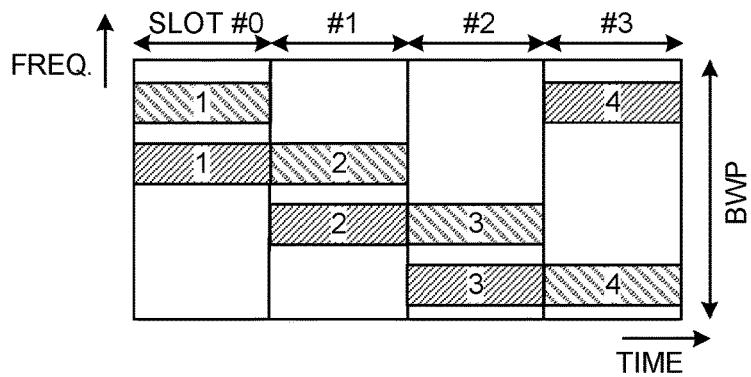
FIGS. 8A to 8D are diagrams to show examples of multiplexing of a plurality of user terminals when the inter-slot frequency hopping according to the first aspect is employed.
Figure 8B:
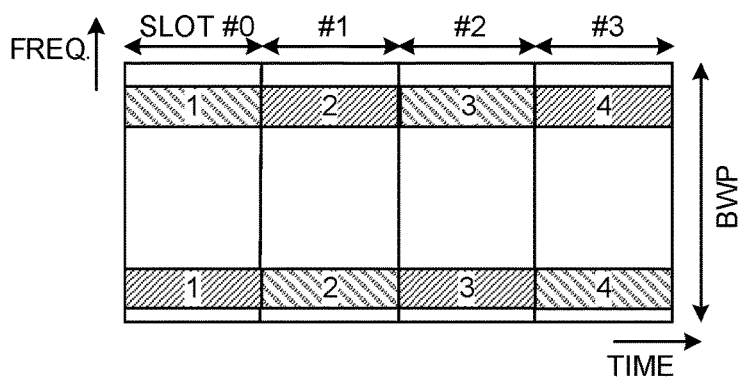
Figure 8C:
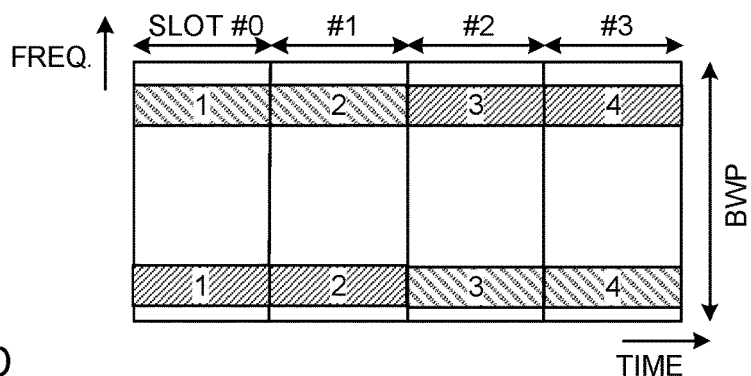
Figure 8D:
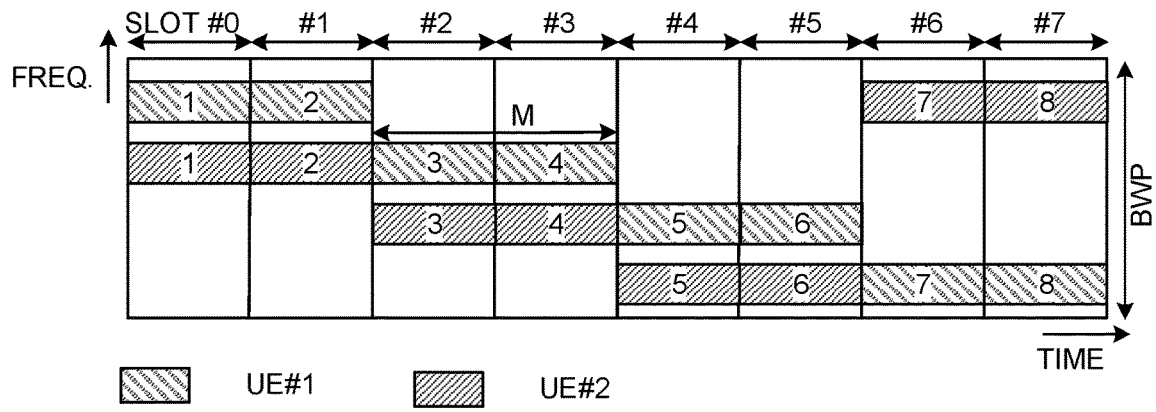

In FIG. 8A, since a fourth-hop frequency resource for user terminal #2 is lower than an end of the BWP, the fourth-hop frequency resource is determined to be the same as the first-hop frequency resource for user terminal #1. This also applies to FIG. 8D.

In this way, when the index of the i-th hop frequency resource is not included in an access BW (for example, BWP) configured for a user terminal, the i-th frequency resource may be determined based on a remainder of the index and the resource units (for example, the number of PRBs or the number of REs) in the BWP.

In the first aspect, when inter-slot frequency hopping is employed on the PUCCH/PUSCH, the radio base station reports to the user terminal about frequency resource information (for example, information indicating frequency offset k shown in any of FIGS. 6A to 6D and FIGS. 7A and 7B), whereby the user terminal can appropriately control the pattern of inter-slot frequency hopping, based on the frequency resource information.

(Second Aspect)

A second aspect is different from the first aspect in that, when inter-slot frequency hopping is employed on a PUCCH/PUSCH over a plurality of slots, a network (for example, a radio base station) does not explicitly report about information related to frequency resources to which the PUCCH/PUSCH is to be mapped (frequency resource information). In other words, in the second aspect, the user terminal determines frequency resources to which the PUCCH/PUSCH is to be mapped, based on implicit information.

Specifically, the user terminal may determine, based on information related to frequency resources for the PUCCH/PUSCH on which intra-slot frequency hopping is employed (intra-slot FH information), frequency resources to which the PUCCH/PUSCH employing inter-slot frequency hopping is to be mapped.

Here, the intra-slot FH information may include information indicating an index of certain frequency resource for the PUCCH/PUSCH on which intra-slot frequency hopping is employed (for example, a first-hop (starting) frequency resource) (for example, an index of a PRB and/or a resource element (RE) (PRB/RE)) and information related to other frequency resources (for example, frequent resources for the second and subsequent hops). The information related to the other frequency resources may be, for example, information indicating a predetermined frequency offset (frequency offset information) or information indicating indices of the other frequency resources.

The user terminal may determine frequency resources for the PUCCH/PUSCH on which inter-slot frequency hopping is employed, based on the frequency resources indicated by the intra-slot FH information. For example, the user terminal may employ a pattern of the intra-slot frequency hopping indicated by the intra-slot FH information, directly for inter-slot frequency hopping. Alternatively, the user terminal may employ, for inter-slot frequency hopping, a pattern resulting from multiplying the pattern of intra-slot frequency hopping indicated by the intra-slot FH information by m (m=positive integer).

Note that the intra-slot FH information may include information related to time resources for the PUCCH/PUSCH on which intra-slot frequency hopping is employed. The user terminal may determine time resources for the PUCCH/PUSCH on which inter-slot frequency hopping is employed, based on the time resources indicated by the intra-slot FH information.

Figure 9A:
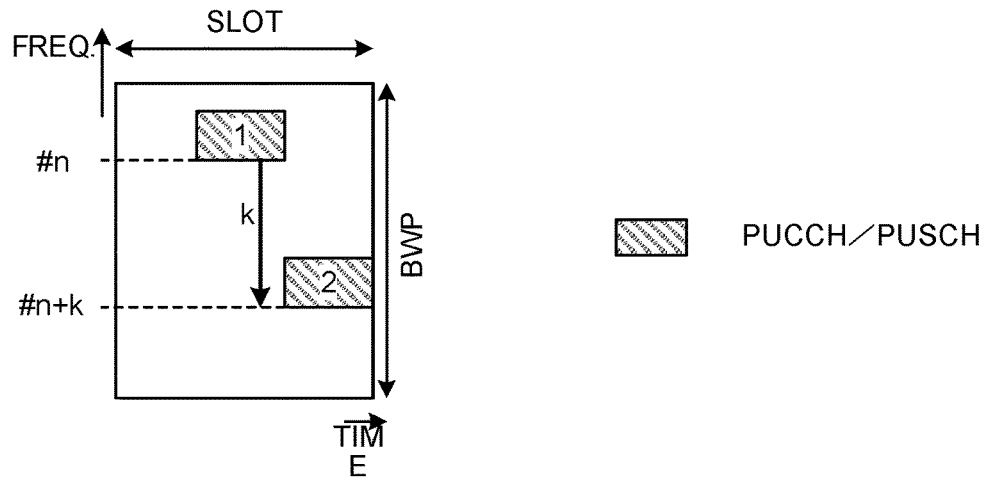
FIGS. 9A to 9C are diagrams to show examples of determination of frequency resources for a PUCCH/PUSCH on which inter-slot frequency hopping according to a second aspect is employed.
Figure 9B:
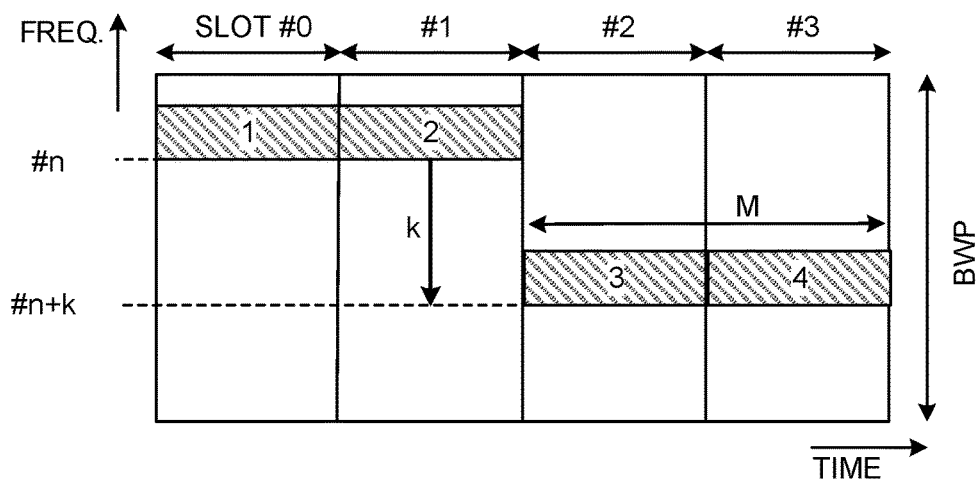
Figure 9C:
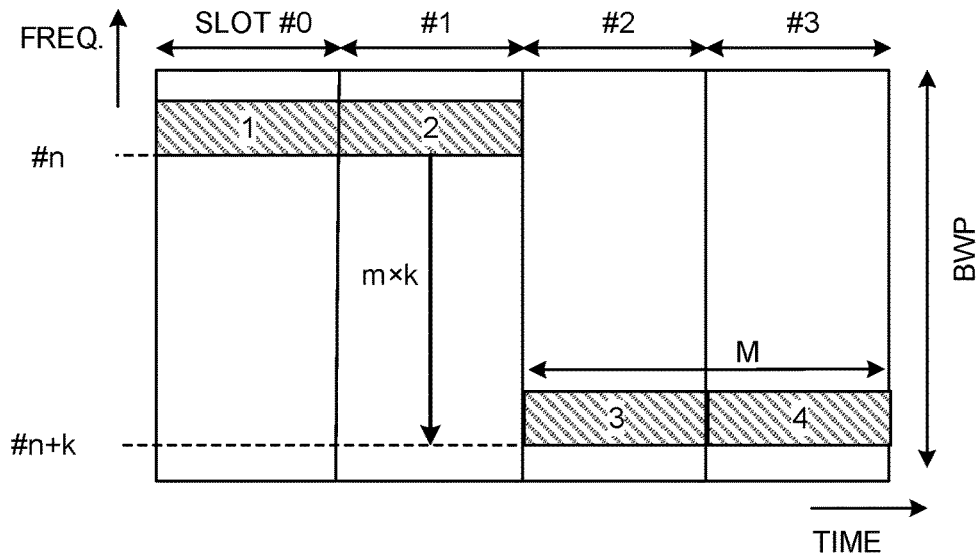

FIG. 9 illustrates diagrams to show examples of determination of frequency resources for a PUCCH/PUSCH on which inter-slot frequency hopping according to the second aspect is employed. Note that, although a case where frequency offset k from a previous-hop frequency resource is used is described with reference to FIGS. 9A to 9C, this is also appropriately applicable to a case of using frequency offset k from a reference frequency resource (FIG. 7A) or frequency offset k from an access BW (for example, BWP) of a user terminal (FIG. 7B).

In FIG. 9A, the user terminal is reported about intra-slot FH information indicating index # n of a first-hop frequency resource and/or frequency offset k in intra-slot frequency hopping.

In FIG. 9B, the pattern of intra-slot frequency hopping in FIG. 9A may be applied to inter-slot frequency hopping, based on the intra-slot FH information. Note that, in FIG. 9B, the number M of hopping slots (hopping timing or hopping boundary) may be determined based on the number of slots to which the PUCCH/PUSCH is allocated, may be configured through higher layer signaling, or may be determined in advance.

In FIG. 9C, a pattern resulting from multiplying the pattern of intra-slot frequency hopping in FIG. 9A by m (m=positive integer) may be employed for inter-slot frequency hopping, based on the intra-slot FH information. Here, m may be specified through higher layer signaling and/or physical layer signaling (for example, DCI) or may be derived by the user terminal itself according to a predetermined rule. For example, m may be determined based on a user terminal group and/or a user terminal category (for example, eMBB (enhanced Mobile Broad Band), eMTC (enhanced Machine Type Communication), URLLC (Ultra Reliable and Low Latency Communications), or the like).

Note that, although it is assumed above that the radio base station reports to the user terminal about intra-slot FH information, a pattern of intra-slot frequency hopping (for example, at least one of frequency resources, frequency offset, time resources, and hopping timing, or the like) may be derived based on at least one of a user terminal access BW (UE BWP), a cell bandwidth (cell BW), an UL BWP, and a DL BWP.

In FIGS. 9B and 9C, the description has been given of the example in which frequency resources for the PUCCH/PUSCH on which inter-slot frequency hopping is employed are determined based on intra-slot FH information. However, time resources (for example, the number of symbols per slot or the like) for the PUCCH/PUSCH may also be controlled in addition to the frequency resources.

Even when intra-slot frequency hopping is employed on a PUCCH/PUSCH over a plurality of slots, employing intra-slot frequency hopping in a slot may be controlled based on the number of symbols (for example, the number of UL symbols) available in the slot. For example, when the number of symbols available in a slot is smaller than a predetermined threshold X, employing the intra-slot frequency hopping in the slot may be set at off. Note that X may be 7 or 4, for example.

In the second aspect, when inter-slot frequency hopping is employed on a PUCCH/PUSCH, the user terminal can appropriately control the pattern of inter-slot frequency hopping without the radio base station reporting to the user terminal about frequency resource information described in the first aspect, whereby overhead can be reduced.

(Third Aspect)

In a third aspect, a description will be given of control of timing of hopping (hopping boundary) of frequency resources when inter-slot frequency hopping is employed on a PUCCH/PUSCH over a plurality of slots.

<First Determination Method>

A hopping boundary in inter-slot frequency hopping may be determined based on the number of slots satisfying a predetermined condition. The predetermined condition may be, for example, a slot in which the number of symbols possible to transmit a PUCCH/PUSCH in the slot is equal to or greater than a predetermined threshold (or exceeds the predetermined threshold).

The number of symbols possible to transmit a PUCCH/PUSCH in the slot (for example, the number of UL symbols) may be specified through higher layer signaling and/or physical layer signaling. For example, the number of symbols may be specified by slot format information (SFI).

The number of slots to which the PUCCH/PUSCH is allocated may be specified through higher layer signaling and/or physical layer signaling.

Figure 10A:
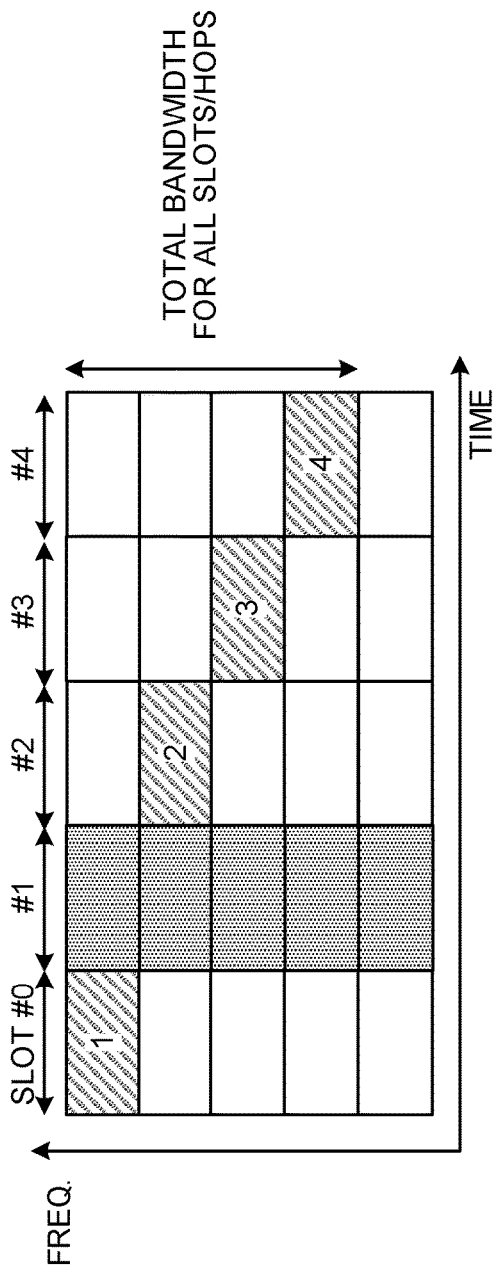
FIGS. 10A and 10B are diagrams to show a first example of determination of a hopping boundary in inter-slot frequency hopping according to a third aspect.

FIG. 10 illustrates diagrams to show a first example of determination of a hopping boundary in inter-slot frequency hopping according to the third aspect. In FIG. 10A, it is assumed that slot #1 is a slot not satisfying the predetermined condition described above, while other slots satisfy the predetermined condition.

Figure 10B:
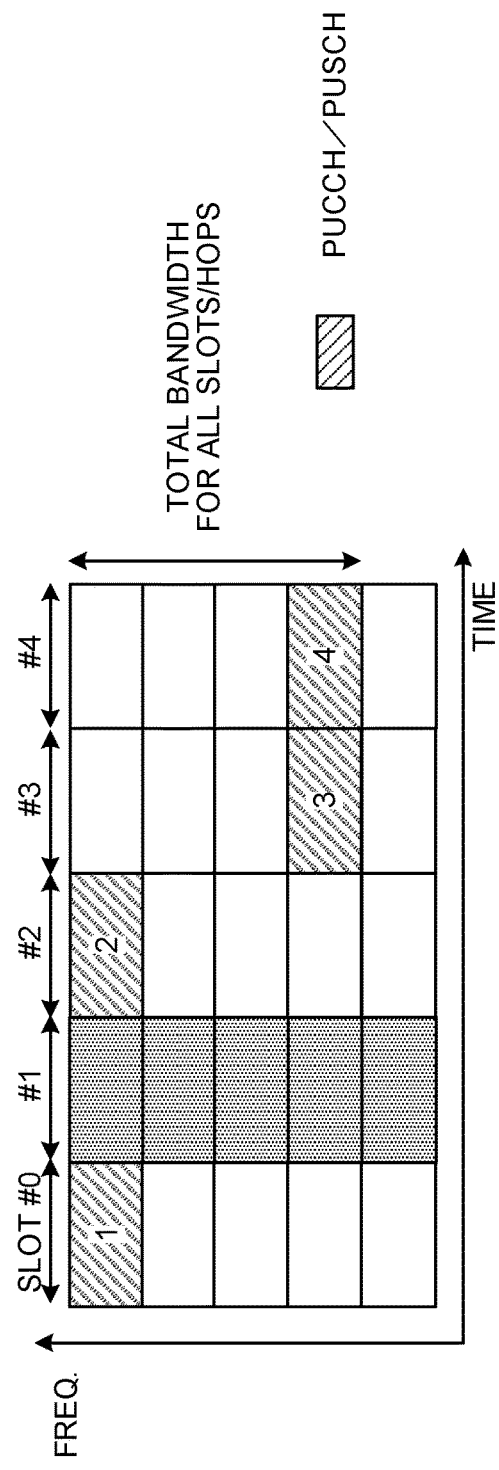

As illustrated in FIGS. 10A and 10B, the user terminal may not necessarily count slot #1, which does not satisfy the predetermined condition, as a slot for transmitting a PUCCH/PUSCH. In this case, the user terminal may determine frequency resources to which the PUCCH/PUSCH is to be mapped in inter-slot frequency hopping without taking account of slot #1.

For example, in FIG. 10A, slot #2 next to slot #1 serves as a second-hop frequency resource. In FIG. 10B, since the number M of hopping slots is configured to be two (M=2), the frequency resource in slot #2 is similar to slot #0 without counting slot #1.

In the first determination method, the pattern of inter-slot frequency hopping is determined by taking account only of slots possible to transmit a PUCCH/PUSCH, whereby frequency diversity effect for the PUCCH/PUSCH can be more effectively obtained.

<Second Determination Method>

Alternatively, a hopping boundary in inter-slot frequency hopping may be determined without being based on the number of slots satisfying the predetermined condition described above. A description will be given of a second determination method mainly in terms of a different respect from the first determination method.

Figure 11A:
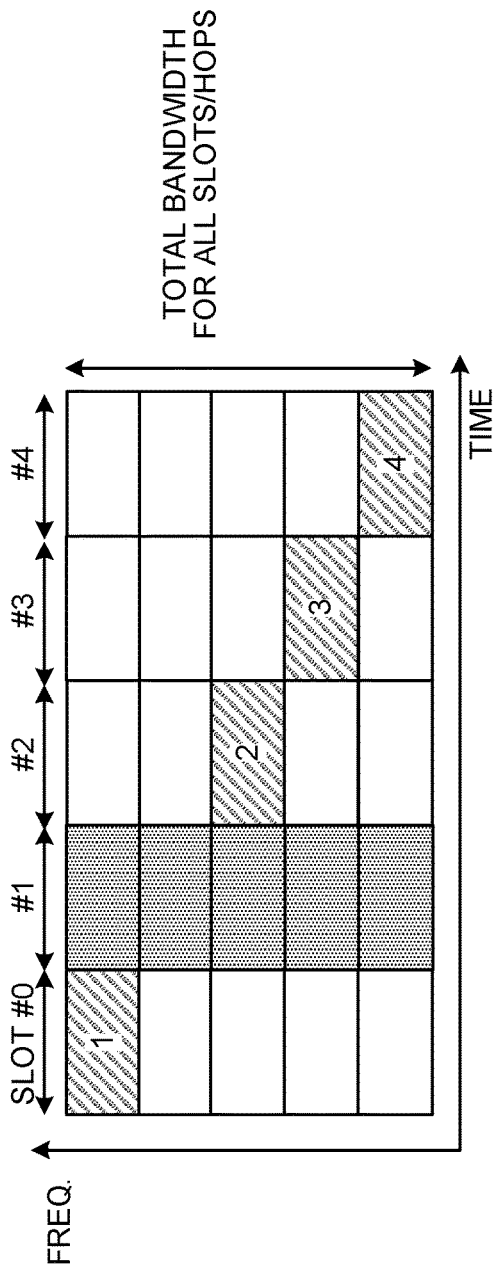
FIGS. 11A and 11B are diagrams to show a second example of determination of the hopping boundary in the inter-slot frequency hopping according to the third aspect.
Figure 11B:
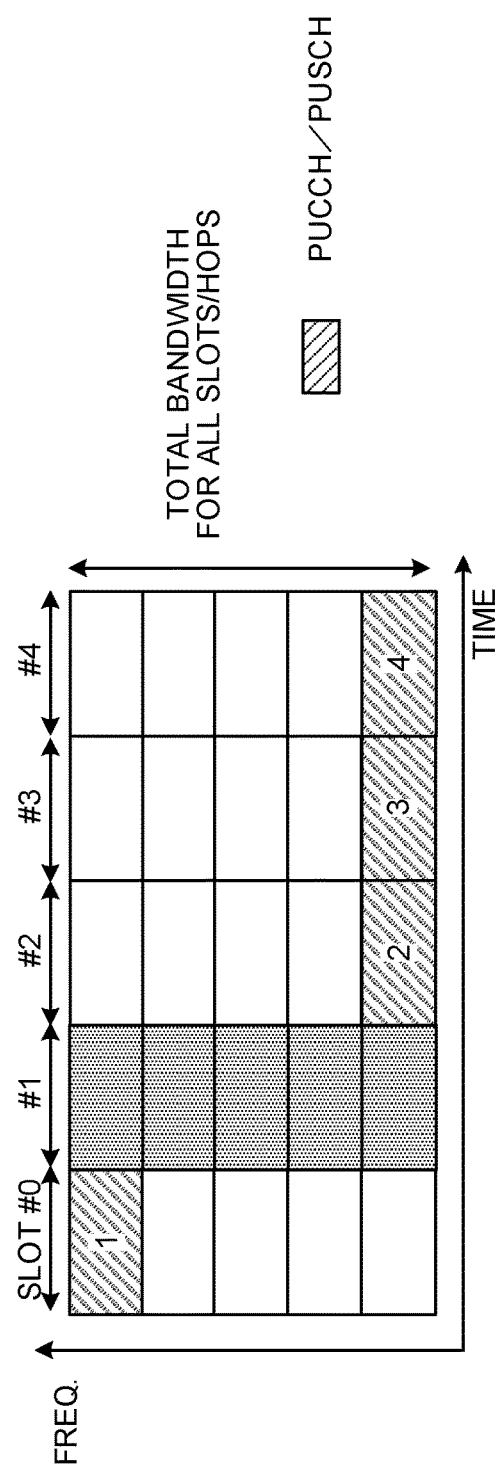

FIG. 11 illustrates diagrams to show a second example of determination of a hopping boundary in inter-slot frequency hopping according to the third aspect. As illustrated in FIGS. 11A and 11B, the user terminal may count slot #1, which does not satisfy the predetermined condition, as a slot for transmitting a PUCCH/PUSCH. In this case, the user terminal may determine frequency resources to which the PUCCH/PUSCH is to be mapped in inter-slot frequency hopping by taking account of slot #1.

For example, in FIG. 11A, since slot #1 next to slot #0 serves as a second-hop frequency resource, the frequency resource in slot #2 has a frequency offset of the double of the frequency resource of slot #1. In FIG. 11B, since the number M of hopping slots is configured to be two (M=2), the frequency resource in slot #2 corresponds to a frequency resource hopping by counting slot #1.

In the second determination method, the pattern of inter-slot frequency hopping is determined irrespective of whether each slot is a slot possible to transmit a PUCCH/PUSCH, whereby the pattern determination can be simplified.

In the above-described third aspect, a hopping boundary can be appropriately controlled when inter-slot frequency hopping is employed on a PUCCH/PUSCH.

(Fourth Aspect)

In a fourth aspect, a detailed description will be given of signaling in the case of employing inter-slot frequency hopping on a PUCCH.

A user terminal is configured with (reported by a radio base station about) a plurality of sets (PUCCH resource sets, parameter sets) each including one or more parameters related to resources for the PUCCH (PUCCH resources) through higher layer signaling in advance. One of the plurality of PUCCH resource sets is specified by using a predetermined field in downlink control information (DCI). The user terminal controls transmission of the PUCCH, based on the PUCCH resource set indicated by a value of predetermined field in the DCI.

When inter-slot frequency hopping is employed on the PUCCH, each of the PUCCH resource sets configured through higher layer signaling may include frequency resource information described in the first aspect and the like.

FIG. 12 illustrates diagrams to show an example of PUCCH resource sets according to the fourth aspect. As shown in FIG. 12A, values in the predetermined field in the DCI indicate respective PUCCH resource sets. For example, in FIG. 12A, values of predetermined field "00," "01," "10," and "11" indicate PUCCH resource sets #0, #1, #2, and #3, respectively.

As illustrated in FIG. 12B, each of the PUCCH resource sets may include at least one of the following parameters.

Information indicating a starting symbol of the PUCCH

Information indicating the number of symbols for the PUCCH in the slot

Information (for example, an index of a starting PRB) identifying the first-hop frequency resource (for example, the starting RPB) of the PUCCH Information indicating the number of resource units (for example, the number of PRBs) constituting the frequency resource of the PUCCH Information indicating enabling frequency hopping or not (on or off)

Information related to the frequency resources for second and subsequent hops in a case of enabling frequency hopping (this may be, for example, information indicating frequency offsets shown in FIGS. 4A to 4C or information indicating indices of the respective frequency resources for second and subsequent hops Information indicating which one of intra-slot frequency hopping and inter-slot frequency hopping is enabled for the PUSCH over a plurality of slots (information indicating a frequency hopping mode)

Note that at least one of the parameters shown in FIG. 12B may be semi-statically configured through higher layer signaling instead of being dynamically specified as a PUCCH resource set.

Note that the user terminal (UE) may estimate a PUCCH format, based on reported PUCCH resource without being explicitly reported about the PUCCH format to the UE. For example, when the reported number of symbols of the PUCCH is smaller than four, the UE can estimate that the PUCCH format for a short PUCCH is reported. In FIG. 12A, each of the PUCCH resource sets may indicate a PUCCH resource of a single PUCCH format. Furthermore, different PUCCH formats may be used for respective PUCCH resource sets. Furthermore, at least one of the parameters in FIG. 12B may be specified for each PUCCH resource set and for each PUCCH format. For example, enabling frequency hopping or not for each of the PUCCH resource sets may be specified for each of PUCCH formats 0 to 4.

Furthermore, each value of predetermined field in the DCI shown in FIG. 12A may indicate a PUCCH resource set of each PUCCH format. For example, the value of predetermined field "00" may indicate PUCCH resource set #0 in PUCCH format 0 and PUCCH resource set #4 in PUCCH format 1. In this way, the same value of predetermined field may indicate the same and/or different PUCCH resource sets among the PUCCH formats.

According to the fourth aspect, when inter-slot frequency hopping is employed on the PUCCH, a PUCCH resource set including frequency resource information of the PUCCH (for example, information indicating frequency offset k shown in any of FIGS. 6A to 6D and FIGS. 7A and 7B) is specified for the user terminal, whereby the user terminal can appropriately control the pattern of inter-slot frequency hopping for the PUCCH, based on the frequency resource information.

(Fifth Aspect)

In a fifth aspect, a description will be given of signaling in the case of employing inter-slot frequency hopping for a PUSCH.

DCI for scheduling a PUSCH in one or a plurality of slots may include information (time resource information) indicating symbols and/or slots to be used for transmission of the PUSCH in each slot. The time resource information may be, for example, information indicating an index of the first symbol (starting symbol index) and/or the number (time length or duration) of the symbols to which the PUSCH is allocated in a slot (for example, an index associated with the starting symbol index and/or the number of symbols in a predetermined table), or information indicating the number of slots.

Furthermore, one of the plurality of configurations of the PUSCH (PUSCH configurations) may be configured for a user terminal through higher layer signaling (for example, RRC signaling). The plurality of PUSCH configurations include a default PUSCH configuration (also referred to as configuration 1, default configuration, and so on) to be used until a PUSCH configuration is configured through higher layer signaling.

Allocation of frequency resources for the PUSCH is carried out in a predetermined resource unit (for example, PRB or group including one or more PRBs (resource block group (RBG))). The size of each RBG (RBG size or the number of PRBs in each RBG) may be determined for each PUSCH configuration depending on the number of PRBs in the access BW (for example, the BWP) of the user terminal.

For example, when the access BW is constituted of $X_0$ to $X_1$ PRBs, RBG size 1 may be used for PUSCH configuration #1 while RBG size may be used for PUSCH configuration #2. When the access BW is constituted of predetermined numbers of $X_1+1$ to $X_2$ PRBs, RBG size 3 may be used for PUSCH configuration #1 while RBG size 4 may be used for PUSCH configuration #2.

Such an RBG size depending on the access BW for each PUSCH configuration may be defined in a table. In the table, the RBG size is determined for each level of the number of PRBs of the access BW. The number of levels of the number of PRBs is, for example, four to six, and four to six records may be included in the table. Note that the table may be common to the PUSCH and the PUCCH or may be unique to each of the PUSCH and the PUCCH. Alternatively, the RBG size may be fixed irrespective of the duration (the number of symbols) of the PUSCH.

When inter-slot frequency hopping is employed on the PUSCH thus configured, frequency resource information described in the first aspect and the like may be specified by DCI. Furthermore, employing frequency hopping or not may be specified by the DCI.

Here, the DCI may be DCI (also referred to as common DCI, fallback DCI, and so on) mapped to a search space (common search space) common to one or more user terminals and/or DCI (also referred to as individual DCI, non fallback DCI, and so on) mapped to a user-terminal-specific search space.

The fallback DCI is DCI for which contents are not configured through user-terminal-specific higher layer signaling (for example, RRC signaling). The non fallback DCI is DCI for which contents can be configured through user-terminal-specific higher layer signaling (for example, RRC signaling). The non fallback DCI may be used for scheduling of the PUSCH and may be referred to as "UL grant" and so on.

FIG. 13 is a diagram to show an example of DCI according to the fifth aspect. As shown in FIG. 13, DCI (fallback DCI and/or non fallback DCI) may indicate at least one piece of the following information.

Information indicating a starting symbol of the PUSCH

Information indicating the number of symbols of the PUSCH in a slot

Information (c) of frequency resource allocation for the PUSCH

Information (a) indicating enabling frequency hopping or not (on or off)

Information (b) related to the frequency resources for second and subsequent hops in the case of enabling frequency hopping (for example, information indicating frequency offsets shown in any of FIGS. 6A to 6D and FIGS. 7A and 7B (this may be also referred to as "gap," "bandwidth," and so on) or information indicating indices of frequency resources for second and subsequent hops (for example, PRB indices or RE indices))

Information (d) indicating which one of intra-slot frequency hopping and inter-slot frequency hopping is enabled for the PUSCH over a plurality of slots (information indicating a mode of frequency hopping)

Specifically, the kinds of information shown in FIG. 13 may be indicated in separate fields (also referred to as "parameters," "information elements (IEs)," and so on) in the DCI. Alternatively, at least two of these may be indicated in a single field (joint field) in the DCI.

For example, information (a) indicating enabling frequency hopping or not may be indicated in a single field in the DCI, and both information (b) related to the frequency resources for second and subsequent hops and information (c) of frequency resource allocation for the PUSCH may be indicated in another single field (for example, resource allocation field) in the DCI.

Alternatively, information (a) indicating enabling frequency hopping or not, information (b) related to the frequency resources for second and subsequent hops, and information (c) of frequency resource allocation for the PUSCH may all be indicated in a single field (for example, resource allocation field) in the DCI.

Furthermore, information (d) indicating which one of intra-slot frequency hopping and inter-slot frequency hopping is enabled for the PUSCH over a plurality of slots may be indicated in the same joint field for information related to time resource of the PUSCH (for example, information indicating a starting symbol and/or information indicating the number of symbols in the slot), or may be indicated in a different field in the DCI from a field for the information related to time resource.

FIG. 14 illustrates diagrams to show examples of a joint field in DCI according to the fifth aspect. In FIG. 14A, information (a) indicating enabling frequency hopping or not, information (b) of the frequency resources for second and subsequent hops, and information (c) of frequency resource allocation for the PUSCH are indicated in an X-bit joint field (for example, resource allocation field) in the DCI.

For example, in FIG. 14A, ceil [log (Y RBs*(Y RBs+1))] bits indicate information (a) of frequency resource allocation for the PUSCH (for example, the number Y of PRBs), Z bits indicate information (b) of the frequency resources for second and subsequent hops, and information (c) of frequency resource allocation for the PUSCH.

The number X of bits of the joint field may be a fixed value, may be a value configured through higher layer signaling, or may be a value derived from the access BW (for example, UL BWP) of the user terminal. For example, in a case where X is fixed, X may be X=15 when the DCI is fallback DCI, while X may be X=25 when the DCI is non fallback DCI.

Furthermore, the number Z of bits indicating information (b) of the frequency resources for second and subsequent hops and information (c) of frequency resource allocation for the PUSCH may be a fixed value or may be a value derived from a bandwidth S of the access BW (for example, UL BWP) of the user terminal or the total bandwidth S of frequency hopping. For example, Z may be 1 bit (Z=1 bit) when the bandwidth S of the access BW or the total bandwidth S of the frequency hopping is equal to or smaller than a predetermined threshold, while Z may be 2 bits (Z=2 bits) when the total bandwidth S is greater than the predetermined threshold.

FIG. 14B shows information indicated by each bit value when Z=1. For example, a bit value "0" indicates not enabling frequency hopping, while a bit value "1" indicates a frequency offset "½ *S" in the case of enabling frequency hopping.

FIG. 14C shows information indicated by each bit value when Z=2. For example, a bit value "00" indicates not enabling frequency hopping, while bit values "01," "10," "11" indicate frequency offsets "½ *S," "+¼ *S," and "−¼ *S", respectively, in the case of enabling frequency hopping.

The user terminal may control inter-slot frequency hopping of the PUSCH, based on ceil [log (Y RBs*(Y RBs+1))] bits being for information (a) of frequency resource allocation for the PUSCH and the frequency offset indicated by the bit value of Z bits.

Note that the PUSCH for which the above inter-slot frequency hopping is enabled may communicate at least one of user data, higher layer control information, and message 3. Message 3 is higher layer control information transmitted from a user terminal in response to a random access response (RAR or message 2) from a radio base station in a random access procedure.

According to the fifth aspect, when inter-slot frequency hopping is employed on the PUSCH, DCI including frequency resource information of the PUSCH (for example, information indicating frequency offset k illustrated in any of FIGS. 6A to 6D and FIGS. 7A and 7B) is transmitted from the radio base station, whereby the user terminal can appropriately control the pattern of inter-slot frequency hopping for the PUSCH, based on the frequency resource information.

(Radio Communication System)

Hereinafter, a structure of a radio communication system according to the present embodiment will be described. In this radio communication system, the radio communication methods according to the above-described aspects are employed. Note that the radio communication methods according to the above-described aspects may be employed independently or may be employed by combining at least two of the radio communication methods.

Figure 15:
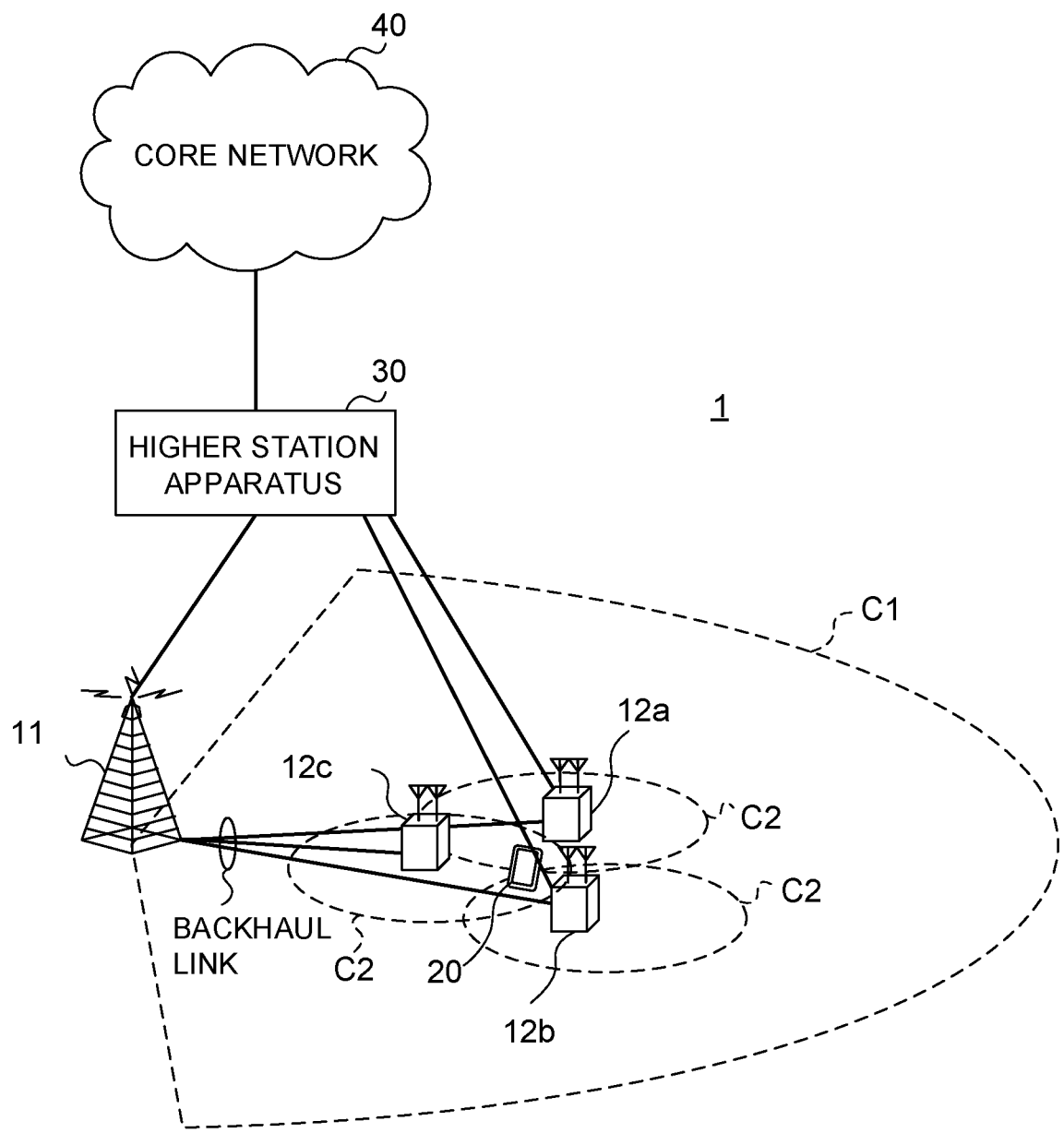
FIG. 15 is a diagram to show an example of a schematic structure of a radio communication system according to the present embodiment.

FIG. 15 is a diagram to show an example of a schematic structure of the radio communication system according to the present embodiment. A radio communication system 1 can adopt carrier aggregation (CA) and/or dual connectivity (DC) to group a plurality of fundamental frequency blocks (component carriers) into one, where the system bandwidth in LTE systems (for example, 20 MHz) constitutes one unit. Note that the radio communication system 1 may be also referred to as "SUPER 3G," "LTE-A (LTE-Advanced)," "IMT-Advanced," "4G," "5G," "FRA (Future Radio Access)," "NR (New RAT: New Radio Access Technology)," and so on.

The radio communication system 1 shown in FIG. 15 is provided with a radio base station 11 that forms a macro cell C1, and radio base stations 12a to 12c that form small cells C2, which are placed within the macro cell C1 and which are narrower than the macro cell C1. Also, user terminals 20 are placed in the macro cell C1 and in each small cell C2. A configuration in which different numerologies are applied between cells and/or within a cell may be adopted.

Here, "numerology" refers to communication parameters in the frequency direction and/or the time direction (for example, at least one of the subcarrier spacing (subcarrier interval), the bandwidth, the symbol length, the time length of CPs (CP length), the subframe length, the time length of TTIs (TTI length), the number of symbols per TTI, the radio frame structure, the filtering process, the windowing process, and so on). The radio communication system 1 may support subcarrier spacings of 15 kHz, 30 kHz, 60 kHz, 120 kHz, 240 kHz, and so on, for example.

The user terminals 20 can connect with both the radio base station 11 and the radio base stations 12. The user terminals 20 may use the macro cell C1 and the small cells C2, which use different frequencies, at the same time by means of CA or DC. Also, the user terminals 20 can execute CA or DC by using a plurality of cells (CCs) (for example, two or more CCs). Furthermore, the user terminals can use licensed band CCs and unlicensed band CCs as a plurality of cells.

Furthermore, the user terminal 20 can perform communication using time division duplex (TDD) or frequency division duplex (FDD) in each cell. A TDD cell and an FDD cell may be referred to as a "TDD carrier (frame structure type 2)" and an "FDD carrier (frame structure type 1)," respectively, for example.

Furthermore, in each cell (carrier), a single numerology may be employed, or a plurality of different numerologies may be employed.

Between the user terminals 20 and the radio base station 11, communication can be carried out using a carrier of a relatively low frequency band (for example, 2 GHz) and a narrow bandwidth (referred to as an "existing carrier," a "legacy carrier," and so on). Meanwhile, between the user terminals 20 and the radio base stations 12, a carrier of a relatively high frequency band (for example, 3.5 GHz, 5

GHz, 30 to 70 GHz, and so on) and a wide bandwidth may be used, or the same carrier as that used with the radio base station 11 may be used. Note that the structure of the frequency band for use in each radio base station is by no means limited to these.

A structure may be employed in which wired connection (for example, an optical fiber in compliance with the CPRI (Common Public Radio Interface), an X2 interface, and so on) or wireless connection is established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME), and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "gNB (gNodeB)," a "transmitting/receiving point (TRP)," and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "eNBs," "gNBs," "transmitting/receiving points," and so on. Hereinafter, the radio base stations 11 and 12 will be collectively referred to as "radio base stations 10," unless specified otherwise.

The user terminals 20 are terminals to support various communication schemes such as LTE, LTE-A, 5G, NR, and so on, and may include not only mobile communication terminals but also stationary communication terminals. Furthermore, the user terminals 20 can perform device-to-device (D2D) communication with other user terminals 20.

In the radio communication system 1, as radio access schemes, OFDMA (Orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency band into a plurality of narrow frequency bands (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combinations of these, and OFDMA may be used in UL.

Furthermore, in the radio communication system 1, a multi-carrier waveform (for example, an OFDM waveform) may be used, or a single-carrier waveform (for example, a DFT-s-OFDM waveform) may be used.

In the radio communication system 1, a DL shared channel (PDSCH (Physical Downlink Shared Channel), which is also referred to as a "DL data channel" and so on), which is used by each user terminal 20 on a shared basis, a broadcast channel (PBCH (Physical Broadcast Channel)), L1/L2 control channels, and so on, are used as downlink (DL) channels. User data, higher layer control information, SIBs (System Information Blocks), and so on are communicated in the PDSCH. Also, MIBs (Master Information Blocks) are communicated in the PBCH.

The L1/L2 control channels include downlink control channels (a PDCCH (Physical Downlink Control Channel) and an EPDCCH (Enhanced Physical Downlink Control Channel)), a PCFICH (Physical Control Format Indicator Channel), a PHICH (Physical Hybrid-ARQ Indicator Channel), and so on. Downlink control information (DCI) including PDSCH and PUSCH scheduling information is communicated in the PDCCH, for example. The number of OFDM symbols to use for the PDCCH is communicated in the PCFICH. The EPDCCH is frequency-division-multiplexed with the PDSCH and used to communicate DCI and so on, like the PDCCH. HARQ retransmission control information (ACK/NACK) in response to the PUSCH can be communicated in at least one of the PHICH, the PDCCH, and the EPDCCH.

In the radio communication system 1, an uplink (UL) shared channel (PUSCH (Physical Uplink Shared Channel, also referred to as an "uplink data channel" and so on)), which is used by each user terminal 20 on a shared basis, an uplink control channel (PUCCH (Physical Uplink Control Channel)), a random access channel (PRACH (Physical Random Access Channel)), and so on are used as uplink (UL) channels. User data and higher layer control information are communicated in the PUSCH. Uplink control information (UCI) including at least one of downlink (DL) signal retransmission control information (A/N), channel state information (CSI), and so on, is communicated in the PUSCH or the PUCCH. By means of the PRACH, random access preambles for establishing connections with cells can be communicated.

<Radio Base Station>

Figure 16:
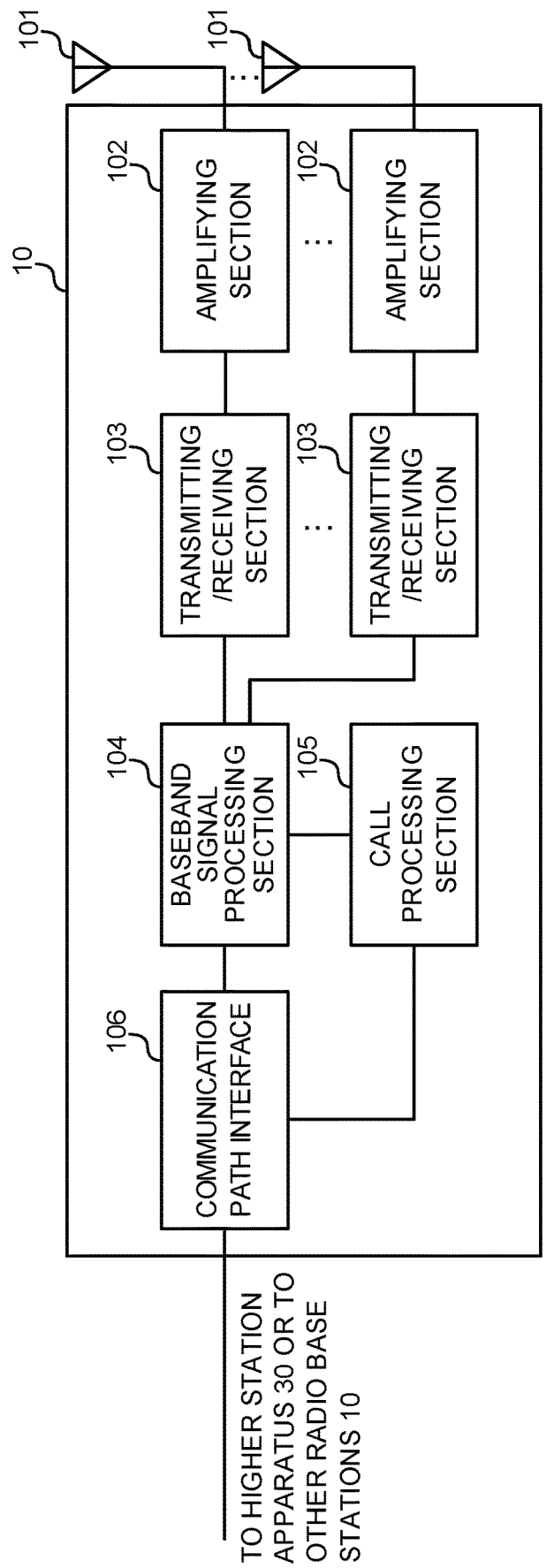
FIG. 16 is a diagram to show an example of an overall structure of a radio base station according to the present embodiment.

FIG. 16 is a diagram to show an example of an overall structure of the radio base station according to the present embodiment. A radio base station 10 is provided with a plurality of transmitting/receiving antennas 101, amplifying sections 102, transmitting/receiving sections 103, a baseband signal processing section 104, a call processing section 105, and a communication path interface 106. Note that the radio base station 10 may be configured to include one or more transmitting/receiving antennas 101, one or more amplifying sections 102, and one or more transmitting/receiving sections 103.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process, and a precoding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101.

The transmitting/receiving sections 103 can be constituted with transmitters/receivers, transmitting/receiving circuits, or pieces of transmitting/receiving apparatus that can be described based on general understanding of the technical field to which the present invention pertains. Note that each transmitting/receiving section 103 may be structured as a transmitting/receiving section in one entity, or may be constituted with a transmitting section and a receiving section.

Meanwhile, as for uplink (UL) signals, radio frequency signals that are received in the transmitting/receiving antennas 101 are amplified in the amplifying sections 102. The transmitting/receiving sections 103 receive the UL signals amplified in the amplifying sections 102. The transmitting/receiving sections 103 converts the received signals into the baseband signal through frequency conversion and outputs to the baseband signal processing section 104.

In the baseband signal processing section 104, UL data that is included in the input UL signals is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing, such as setting up and releasing communication channels, manages the state of the radio base station 10, and manages the radio resources.

The communication path interface 106 transmits and/or receives signals to and/or from the higher station apparatus 30 via a predetermined interface. Also, the communication path interface 106 may transmit and/or receive signals (backhaul signaling) with neighboring radio base stations 10 via an inter-base station interface (for example, an optical fiber in compliance with the CPRI (Common Public Radio Interface) and an X2 interface).

Also, the transmitting/receiving sections 103 transmit downlink (DL) signals (including at least one of DL data signals, DL control signals, and DL reference signals) to the user terminals 20, and receive uplink (UL) signals (including at least one of UL data signals, UL control signals, and UL reference signals) from the user terminals 20.

In addition, the transmitting/receiving sections 103 receive an uplink data channel (for example, a PUSCH) and/or an uplink control channel (for example, a short PUCCH and/or a long PUCCH).

Also, the transmitting/receiving sections 103 transmit control information (higher layer control information) through higher layer signaling and downlink control information (DCI) through physical layer signaling. Specifically, the transmitting/receiving sections 103 transmit frequency resource information (first aspect). For example, the transmitting/receiving sections 103 may transmit a plurality of parameter sets (PUCCH resource sets) each including the frequency resource information through higher layer signaling and transmit downlink control information indicating one of the plurality of parameter sets (fourth aspect). The transmitting/receiving sections 103 may transmit downlink control information including the frequency resource information (fifth aspect).

Figure 17:
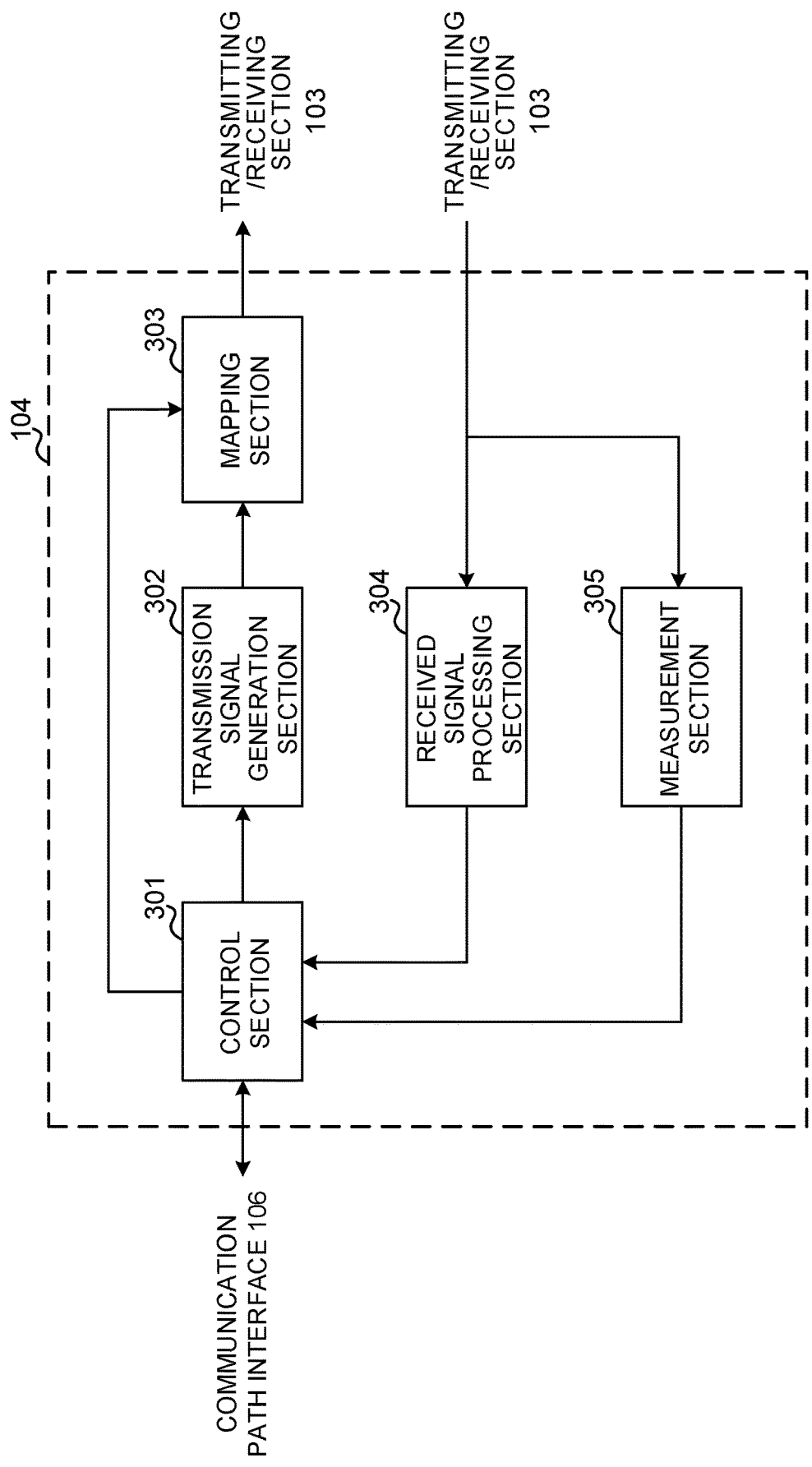
FIG. 17 is a diagram to show an example of a functional structure of the radio base station according to the present embodiment.

FIG. 17 is a diagram to show an example of a functional structure of a radio base station according to the present embodiment. Note that, although FIG. 17 primarily shows functional blocks that pertain to characteristic parts of the present embodiment, the radio base station 10 includes other functional blocks that are necessary for radio communication as well. As shown in FIG. 17, the baseband signal processing section 104 is provided with a control section 301, a transmission signal generation section 302, a mapping section 303, a received signal processing section 304, and a measurement section 305.

The control section 301 controls the whole of the radio base station 10. The control section 301 controls, for example, the generation of DL signals by the transmission signal generation section 302, the mapping of DL signals by the mapping section 303, the receiving processes (for example, demodulation) for UL signals by the received signal processing section 304, and the measurements by the measurement section 305.

To be more specific, the control section 301 performs scheduling for the user terminals 20. Specifically, the control section 301 may perform scheduling and/or retransmission control of the downlink data channel and/or uplink data channel, based on UCI (for example, CSI and/or BI) from the user terminals 20.

Furthermore, the control section 301 may control a structure (format) of an uplink control channel (for example, a long PUCCH and/or a short PUCCH) and perform control to transmit control information related to the uplink control channel.

Also, the control section 301 may control intra-slot frequency hopping and/or inter-slot frequency hopping of an uplink control channel (for example, a long PUCCH and/or a short PUCCH) in one slot or over a plurality of slots. Specifically, the control section 301 may control generation and/or transmission of the frequency resource information.

Furthermore, the control section 301 may control intra-slot frequency hopping and/or inter-slot frequency hopping of an uplink data channel (for example, a PUSCH) in one slot or over a plurality of slots. Specifically, the control section 301 may control generation and/or transmission of the frequency resource information.

Also, the control section 301 may control generation and/or transmission of PUCCH resource sets.

The control section 301 may control the received signal processing section 304 to perform a receiving process of UCI from the user terminals 20, based on the uplink control channel format.

The control section 301 can be constituted with a controller, a control circuit, or control apparatus that can be described based on general understanding of the technical field to which the present invention pertains.

The transmission signal generation section 302 generates DL signals (including DL data signals, DL control signals, and DL reference signals), based on commands from the control section 301 and outputs the DL signals to the mapping section 303.

The transmission signal generation section 302 may be a signal generator, a signal generation circuit, or signal generation apparatus that can be described based on general understanding of the technical field to which the present invention pertains.

The mapping section 303 maps the DL signals generated in the transmission signal generation section 302 to predetermined radio resources, based on commands from the control section 301, and outputs these to the transmitting/receiving sections 103. The mapping section 303 may be a mapper, a mapping circuit, or mapping apparatus that can be described based on general understanding of the technical field to which the present invention pertains.

The received signal processing section 304 performs the receiving process (for example, demapping, demodulation, decoding, and so on) of UL signals (including, for example, UL data signals, UL control signals, and UL reference signals) that are transmitted from the user terminals 20. Specifically, the received signal processing section 304 may output the received signals, the signals after the receiving process, and so on, to the measurement section 305. Furthermore, the received signal processing section 304 performs the receiving process of UCI, based on the uplink control channel structures according to commands from the control section 301.

The measurement section 305 conducts measurements with respect to the received signals. The measurement section 305 can be constituted with a measurer, a measurement circuit, or measurement apparatus that can be described based on general understanding of the technical field to which the present invention pertains.

The measurement section 305 may measure the channel quality in UL, based on, for example, the received power (for example, RSRP (Reference Signal Received Power)) and/or the received quality (for example, RSRQ (Reference Signal Received Quality)) of UL reference signals. The measurement results may be output to the control section 301.

<User Terminal>

Figure 18:
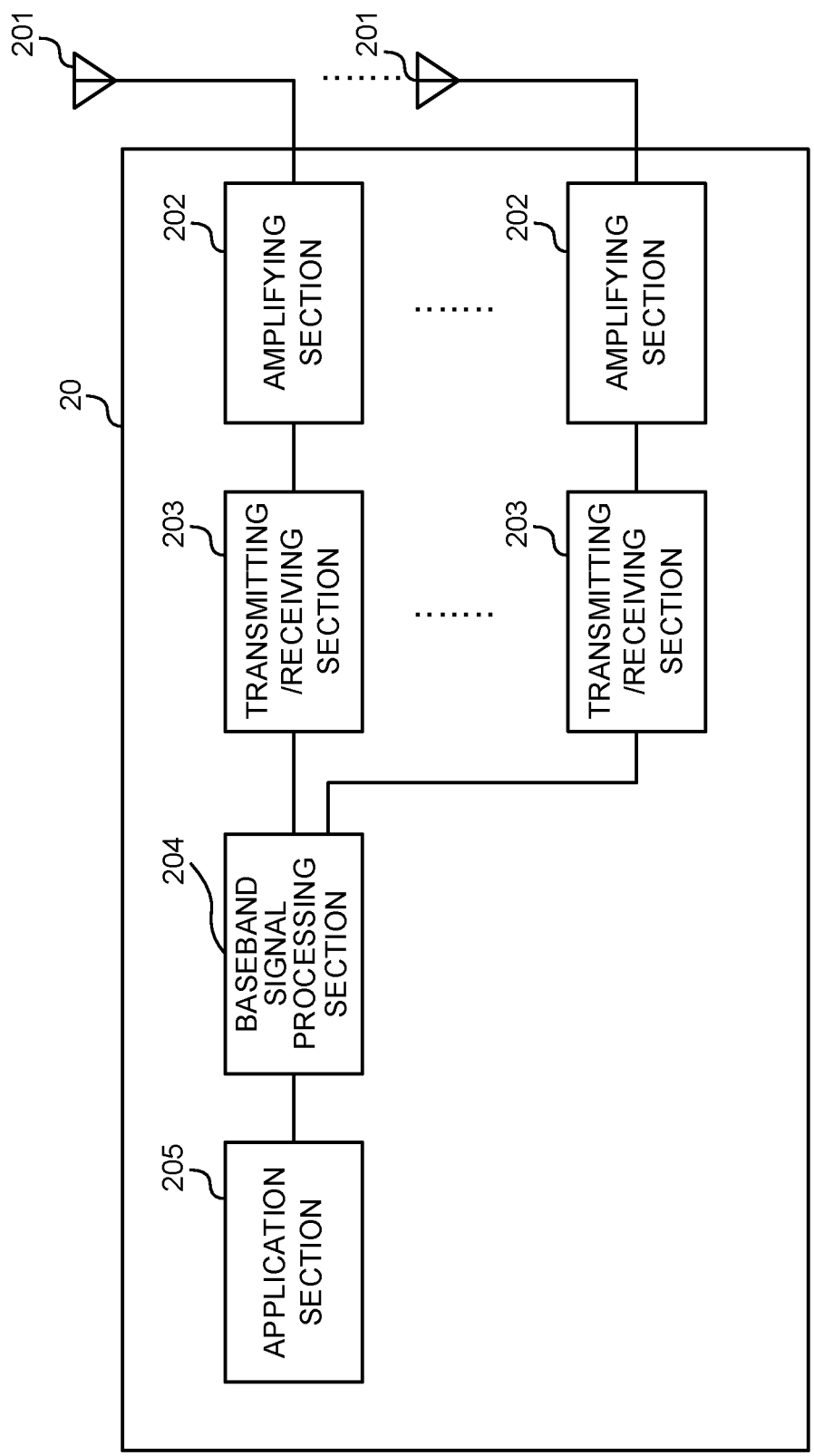
FIG. 18 is a diagram to show an example of an overall structure of a user terminal according to the present embodiment.

FIG. 18 is a diagram to show an example of an overall structure of a user terminal according to the present embodiment. Each user terminal 20 is provided with a plurality of transmitting/receiving antennas 201 for MIMO communication, amplifying sections 202, transmitting/receiving sections 203, a baseband signal processing section 204, and an application section 205.

Radio frequency signals that are received in the plurality of transmitting/receiving antennas 201 are amplified in the amplifying sections 202. The transmitting/receiving sections 203 receive DL signals amplified in the amplifying sections 202. The transmitting/receiving sections 203 convert the received signals into baseband signals through frequency conversion, and output the baseband signals to the baseband signal processing section 204.

The baseband signal processing section 204 performs, on each input baseband signal, an FFT process, error correction decoding, a retransmission control receiving process, and so on. The DL data is forwarded to the application section 205. The application section 205 performs processes related to higher layers above the physical layer and the MAC layer, and so on. Broadcast information is also forwarded to the application section 205.

Meanwhile, the uplink (UL) data is input from the application section 205 to the baseband signal processing section 204. The baseband signal processing section 204 performs a retransmission control transmission process (for example, an HARQ transmission process), channel coding, rate matching, puncturing, a discrete Fourier transform (DFT) process, an IFFT process, and so on, and the result is forwarded to each transmitting/receiving section 203. On UCI, at least one of channel coding, rate matching, puncturing, a DFT process, and an IFFT process is performed, and the result is transferred to each transmitting/receiving section 203.

The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

Furthermore, the transmitting/receiving sections 203 receive the downlink (DL) signals (including DL data signals, DL control signals, and DL reference signals) of the numerology configured in the user terminals 20, and transmit the UL signals (including UL data signals, UL control signals, and UL reference signals) of the numerology.

In addition, the transmitting/receiving sections 203 transmit an uplink data channel (for example, a PUSCH) and/or an uplink control channel (for example, a short PUCCH and/or a long PUCCH).

Furthermore, the transmitting/receiving sections 203 receive control information (higher layer control information) through higher layer signaling and downlink control information (DCI) through physical layer signaling. Specifically, the transmitting/receiving sections 203 receive frequency resource information (first aspect). Also, the transmitting/receiving sections 203 may receive a plurality of parameter sets (PUCCH resource sets) each including the frequency resource information, through higher layer signaling, and receive downlink control information indicating one of the plurality of parameter sets (fourth aspect). The transmitting/receiving sections 203 may receive downlink control information including the frequency resource information (fifth aspect).

The transmitting/receiving sections 203 may be transmitters/receivers, transmitting/receiving circuits, or pieces of transmitting/receiving apparatus that can be described based on general understanding of the technical field to which the present invention pertains. In addition, each transmitting/receiving section 203 may be structured as a transmitting/receiving section in one entity, or may be constituted with a transmitting section and a receiving section.

Figure 19:
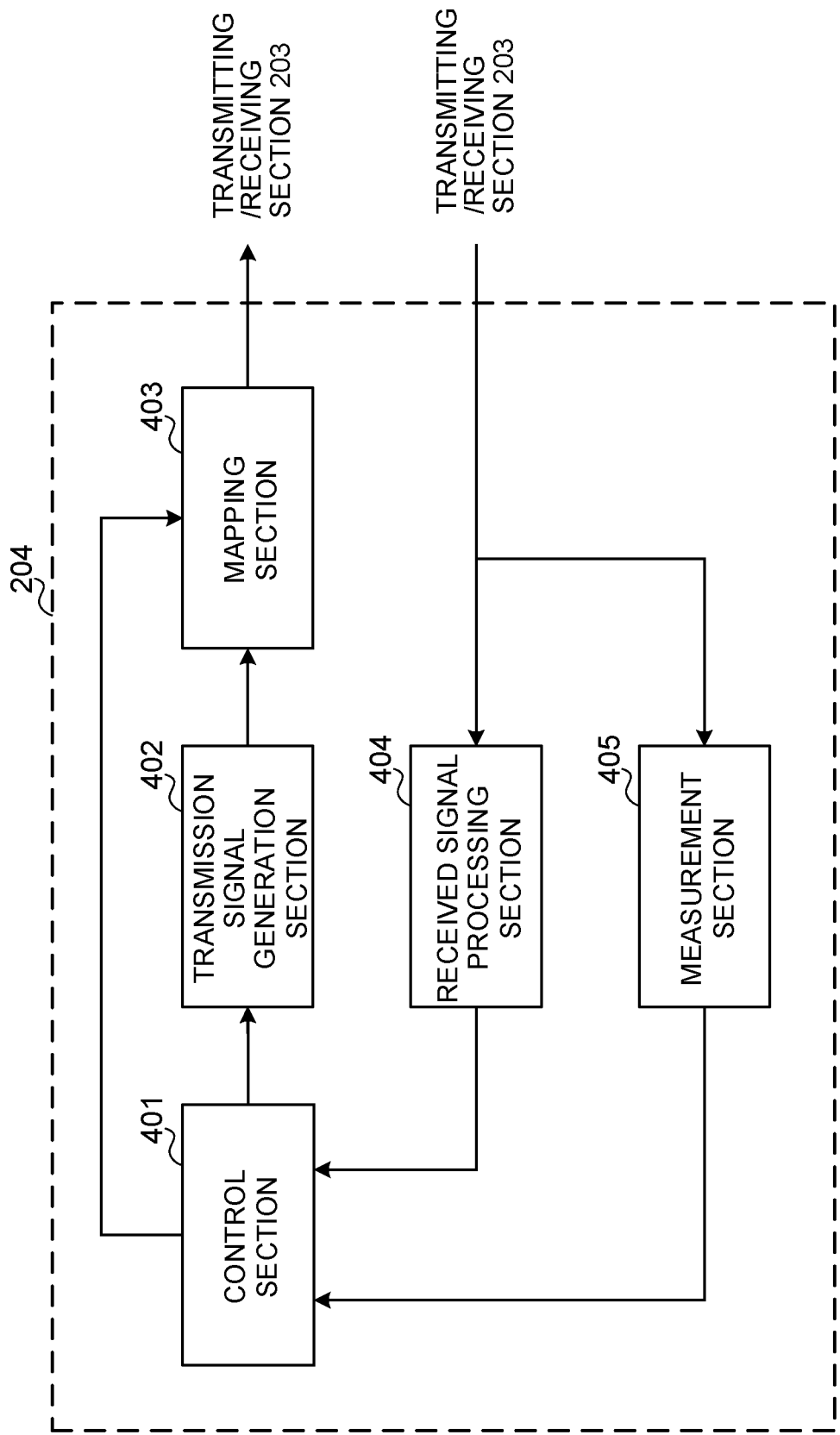
FIG. 19 is a diagram to show an example of a functional structure of the user terminal according to the present embodiment.

FIG. 19 is a diagram to show an example of a functional structure of a user terminal according to the present embodiment. Note that, although FIG. 19 primarily shows functional blocks that pertain to characteristic parts of the present embodiment, the user terminal 20 includes other functional blocks that are necessary for radio communication as well. As shown in FIG. 19, the baseband signal processing section 204 included in the user terminal 20 is provided with a control section 401, a transmission signal generation section 402, a mapping section 403, a received signal processing section 404, and a measurement section 405.

The control section 401 controls the whole of the user terminal 20. The control section 401 controls, for example, the generation of UL signals in the transmission signal generation section 402, the mapping of UL signals in the mapping section 403, the DL signal receiving processes in the received signal processing section 404, the measurements in the measurement section 405, and so on.

Furthermore, the control section 401 controls an uplink control channel used for transmission of UCI from the user terminal 20, based on an explicit command from the radio base station 10 or an implicit determination in the user terminal 20.

Furthermore, the control section 401 may control a structure (format) of an uplink control channel (for example, a long PUCCH and/or a short PUCCH). The control section 401 may control the uplink control channel format, based on the control information from the radio base station 10.

Also, the control section 401 may control transmission of an uplink control channel (for example, a long PUCCH and/or a short PUCCH) in one slot or over a plurality of slots. Specifically, the control section 401 may control frequency hopping of an uplink control channel in each slot, based on information related to a frequency resource to which the uplink control channel is to be mapped (intra-slot FH information).

Furthermore, the control section 401 may control frequency hopping of an uplink control channel between a plurality of slots.

Specifically, the control section 401 may control frequency hopping of an uplink control channel between a plurality of slots (inter-slot frequency hopping), based on information related to frequency resources to which the uplink control channel is to be mapped (frequency resource information) (first aspect).

Also, in the case of receiving a plurality of parameter sets each including the frequency resource information through higher layer signaling, the control section 401 may control frequency hopping of an uplink control channel between a plurality of slots, based on one of the plurality of parameter sets specified by downlink control information (fourth aspect).

The control section 401 may control frequency hopping of an uplink control channel between a plurality of slots (inter-slot frequency hopping), based on information (intra-slot FH information) related to frequency resources to be used when frequency hopping in a slot (intra-slot frequency hopping) is employed (second aspect).

Here, the information related to frequency resources described above (the frequency resource information and/or intra-slot FH information) may include information indicating any of a frequency offset for the previous-hop frequency resource, a frequency offset for a frequency resource configured through higher layer signaling, and a frequency offset for an edge of a frequency band configured for the user terminal.

When an uplink control channel is transmitted over a plurality of slots, the control section 401 may control inter-slot frequency hopping of the uplink control channel, based on information indicating which one of frequency hopping in each slot (intra-slot frequency hopping) and frequency hopping between the plurality of slots (inter-slot frequency hopping) is employed.

Furthermore, the control section 401 may control transmission of an uplink data channel (for example, a PUSCH) in one slot or over a plurality of slots. Specifically, the control section 401 may control frequency hopping of an uplink data channel in each slot, based on information related to a frequency resource to which the uplink data channel is to be mapped (intra-slot FH information).

Furthermore, the control section 401 may control frequency hopping of an uplink data channel between a plurality of slots.

Specifically, the control section 401 may control frequency hopping of an uplink data channel between a plurality of slots (inter-slot frequency hopping), based on information related to frequency resources to which the uplink data channel is to be mapped (frequency resource information) (first aspect).

Also, in the case of receiving downlink control information including information related to the frequency resources, the control section 401 may control frequency hopping of the uplink data channel between a plurality of slots (inter-slot frequency hopping), based on the downlink control information (fifth aspect).

The control section 401 may control frequency hopping of an uplink control channel between a plurality of slots (inter-slot frequency hopping), based on information (intra-slot FH information) related to frequency resources to be used when frequency hopping in a slot (intra-slot frequency hopping) is employed (second aspect).

Here, the information related to frequency resources described above (the frequency resource information and/or intra-slot FH information) may include information indicating any of a frequency offset for the previous-hop frequency resource, a frequency offset for a frequency resource configured through higher layer signaling, and a frequency offset for an edge of a frequency band configured for the user terminal.

When an uplink data channel is transmitted over a plurality of slots, the control section 401 may control inter-slot frequency hopping of the uplink data channel, based on information indicating which one of frequency hopping in each slot (intra-slot frequency hopping) and frequency hopping between a plurality of slots (inter-slot frequency hopping) is employed.

Furthermore, the control section 401 may determine PUCCH resources to be used in a PUCCH format, based on higher layer signaling and/or downlink control information.

The control section 401 may control at least one of the transmission signal generation section 402, the mapping section 403, and the transmitting/receiving sections 203 to perform a transmission process of UCI, based on the PUCCH format.

The control section 401 can be constituted with a controller, a control circuit, or control apparatus that can be described based on general understanding of the technical field to which the present invention pertains.

The transmission signal generation section 402 generates (for example, through coding, rate matching, puncturing, modulation, and so on) UL signals (including UL data signals, UL control signals, UL reference signals, and UCI), based on commands from the control section 401 and outputs these signals to the mapping section 403. The transmission signal generation section 402 may be a signal generator, a signal generation circuit, or signal generation apparatus that can be described based on general understanding of the technical field to which the present invention pertains.

The mapping section 403 maps the UL signals generated in the transmission signal generation section 402 to radio resources, based on commands from the control section 401, and outputs these to the transmitting/receiving sections 203. The mapping section 403 may be a mapper, a mapping circuit, or mapping apparatus that can be described based on general understanding of the technical field to which the present invention pertains.

The received signal processing section 404 performs a receiving process (for example, demapping, demodulation, decoding, and so on) on DL signals (DL data signals, scheduling information, DL control signals, and DL reference signals). The received signal processing section 404 outputs information received from the radio base station 10, to the control section 401. The received signal processing section 404 outputs, for example, broadcast information, system information, higher layer control information through higher layer signaling such as RRC signaling, physical layer control information (L1/L2 control information), and so on, to the control section 401.

The received signal processing section 404 can be constituted with a signal processor, a signal processing circuit, or signal processing apparatus that can be described based on general understanding of the technical field to which the present invention pertains. Also, the received signal processing section 404 can constitute a receiving section according to the present invention.

The measurement section 405 measures channel states, based on reference signals (for example, CSI-RSs) from the radio base station 10, and outputs the measurement results to the control section 401. Note that the channel state measurements may be conducted per CC.

The measurement section 405 can be constituted with a signal processor, a signal processing circuit, or signal processing apparatus, and a measurer, a measurement circuit, or measurement apparatus that can be described based on general understanding of the technical field to which the present invention pertains.

<Hardware Structure>

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these plurality of pieces of apparatus.

Figure 20:
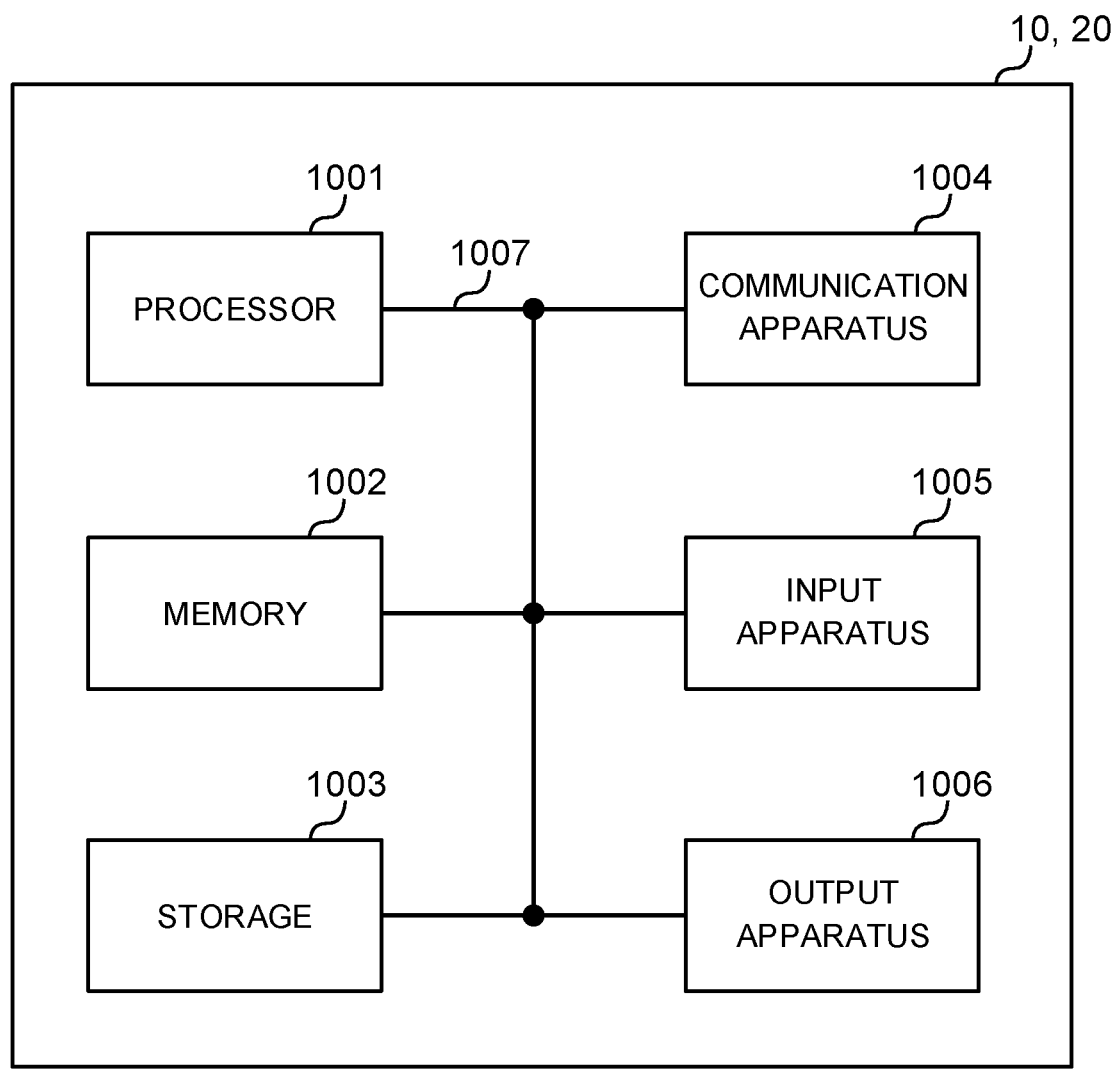
FIG. 20 is a diagram to show an example of a hardware structure of the radio base station and the user terminal according to the present embodiment.

For example, a radio base station, a user terminal, and so on according to one embodiment of the present invention may function as a computer that executes the processes of the radio communication method of the present invention. FIG. 20 is a diagram to show an example of a hardware structure of a radio base station and a user terminal according to the present embodiment. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or more of apparatuses shown in the drawings, or may be designed not to include part of apparatuses.

For example, although only one processor 1001 is shown, a plurality of processors may be provided. Furthermore, processes may be implemented with one processor or may be implemented at the same time, in sequence, or in different manners with one or more processors. Note that the processor 1001 may be implemented with one or more chips.

Each function of the radio base station 10 and the user terminals 20 is implemented, for example, by allowing predetermined software (programs) to be read on hardware such as the processor 1001 and the memory 1002, and by allowing the processor 1001 to perform calculations to control communication via the communication apparatus 1004 and read and/or write data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from the storage 1003 and/or the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (read only memory), an EPROM (erasable programmable ROM), an EEPROM (electrically EPROM), a RAM (random access memory), and other appropriate storage media. The memory 1002 may be referred to as a "register," a "cache," a "main memory (primary storage apparatus)," and so on. The memory 1002 can store executable programs (program codes), software modules, and/or the like for implementing a radio communication method according to one embodiment of the present invention.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via wired and/or wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (Application-Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology used in this specification and/or the terminology that is needed to understand this specification may be replaced by other terms that convey the same or similar meanings. For example, "channels" and/or "symbols" may be replaced by "signals" ("signaling"). Also, "signals" may be "messages." A reference signal may be abbreviated as an "RS," and may be referred to as a "pilot," a "pilot signal", and so on, depending on which standard applies. Furthermore, a "component carrier (CC)" may be referred to as a "cell," a "frequency carrier," a "carrier frequency," and so on.

Furthermore, a radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may have a fixed time length (for example, 1 ms) independent of numerology.

Furthermore, a slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology. A slot may include a plurality of mini-slots. Each mini-slot may be constituted of one or a plurality of symbols in the time domain. A mini-slot may be referred to as a "sub-slot."

A radio frame, a subframe, a slot, a mini-slot, and a symbol all express time units in signal communication. A radio frame, a subframe, a slot, a mini-slot, and a symbol may each be called by other applicable terms. For example, one subframe may be referred to as a "transmission time interval (TTI)," a plurality of consecutive subframes may be referred to as a "TTI," or one slot or one mini-slot may be referred to as a "TTI." That is, a subframe and/or a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, and/or codewords, or may be the unit of processing in scheduling, link adaptation, and so on. Note that, when TTIs are given, the time interval (for example, the number of symbols) to which transport blocks, code blocks and/or codewords are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe," and so on. A TTI that is shorter than a normal TTI may be referred to as a "shortened TTI," a "short TTI," a "partial or fractional TTI," a "shortened subframe," a "short subframe," a "mini-slot," a "sub-slot," and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. Also, an RB may include one or a plurality of symbols in the time domain, and may be one slot, one mini-slot, one subframe, or one TTI in length. One TTI and one subframe each may be constituted of one or a plurality of resource blocks. Note that one or a plurality of RBs may be referred to as a "physical resource block (PRB (Physical RB))," a "sub-carrier group (SCG)," a "resource element group (REG)," a "PRB pair," an "RB pair," and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in this specification may be represented in absolute values or in relative values with respect to predetermined values, or may be represented in another corresponding information. For example, radio resources may be specified by predetermined indices.

The names used for parameters and so on in this specification are in no respect limiting. For example, since various channels (PUCCH (Physical Uplink Control Channel), PDCCH (Physical Downlink Control Channel), and so on) and information elements can be identified by any suitable names, the various names assigned to these individual channels and information elements are in no respect limiting.

The information, signals, and/or others described in this specification may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers and/or from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of predetermined information (for example, reporting of "X holds") does not necessarily have to be reported explicitly, and can be reported implicitly (by, for example, not reporting this predetermined information or reporting another piece of information).

Determinations may be made in values represented by one bit (0 or 1), may be made in Boolean values that represent true or false, or may be made by comparing numerical values (for example, comparison against a predetermined value).

Software, whether referred to as "software," "firmware," "middleware," "microcode," or "hardware description language," or called by other names, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using wired technologies (coaxial cables, optical fiber cables, twisted-pair cables, digital subscriber lines (DSL), and so on) and/or wireless technologies (infrared radiation, microwaves, and so on), these wired technologies and/or wireless technologies are also included in the definition of communication media.

The terms "system" and "network" as used herein may be used interchangeably.

In the present specification, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "transmission reception point," "femto cell," "small cell," and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads)). The term "cell" or "sector" refers to part of or the entire coverage area of a base station and/or a base station subsystem that provides communication services within this coverage.

In the present specification, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

A base station and/or mobile station may be also referred to as "transmission apparatus," "reception apparatus," and so on.

Furthermore, the radio base stations in this specification may be interpreted as user terminals. For example, each aspect/embodiment of the present invention may be applied to a configuration in which communication between a radio base station and a user terminal is replaced with communication between a plurality of user terminals (D2D (Device-to-Device)). In this case, the user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Actions which have been described in this specification to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts, and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next-generation systems that are enhanced based on these.

The phrase "based on" (or "on the basis of") as used in this specification does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used herein does not generally limit the quantity or order of these elements. These designations may be used herein only for convenience, as a method for distinguishing between two or more elements. Thus, reference to the first and second elements does not imply that only two elements may be employed, or that the first element must precede the second element in some way.

The term "judging (determining)" as used herein may encompass a wide variety of actions. For example, "judging (determining)" may be interpreted to mean making "judgments (determinations)" about calculating, computing, processing, deriving, investigating, looking up (for example, searching a table, a database, or some other data structures), ascertaining, and so on. Furthermore, "judging (determining)" may be interpreted to mean making "judgments (determinations)" about receiving (for example, receiving information), transmitting (for example, transmitting information), input, output, accessing (for example, accessing data in a memory), and so on. In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

The terms "connected" and "coupled," or any variation of these terms as used herein mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In this specification, when two elements are connected, the two elements may be considered "connected" or "coupled" to each other by using one or more electrical wires, cables and/or printed electrical connections, and, as some non-limiting and non-inclusive examples, by using electromagnetic energy having wavelengths in radio frequency regions, microwave regions, (both visible and invisible) optical regions, or the like.

In this specification, the phrase "A and B are different" may mean that "A and B are different from each other." The terms "separate," "be coupled," and so on may be interpreted similarly.

When terms such as "including," "comprising," and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

What is claimed is:

1. A terminal comprising:
   a transmitter that transmits an uplink control channel over a plurality of slots; and
   a processor that controls frequency hopping of the uplink control channel over the plurality of slots based on information regarding a first physical resource block index and information regarding a second-hop physical resource block index that are respectively the same as information regarding a first physical resource block index and information regarding a second-hop physical resource block index for when intra-slot frequency hopping is applied,
   wherein the processor determines a pattern of the frequency hopping of the uplink control channel over each of the plurality of slots, regardless of whether or not the uplink control channel is being transmitted in a slot among the plurality of slots, even when the uplink control channel is not being transmitted in the slot among the plurality of slots,
   wherein the information regarding the first physical resource block index is information regarding a physical resource block index of a PUCCH, and the information regarding the second-hop physical resource block index is information regarding a physical resource block index of the PUCCH, and
   wherein the information regarding the first physical resource block index and the information regarding the second-hop physical resource block index are indicated by using a field in downlink control information from one or more parameters configured by higher layer signaling.

2. The terminal according to claim 1, wherein, in the frequency hopping of the uplink control channel over the plurality of slots, the processor maps the uplink control channel to a frequency resource that is hopped per slot.

3. A radio communication method for a terminal comprising:
   transmitting an uplink control channel over a plurality of slots; and
   controlling frequency hopping of the uplink control channel over the plurality of slots based on information regarding a first physical resource block index and information regarding a second-hop physical resource block index that are respectively the same as information regarding a first physical resource block index and information regarding a second-hop physical resource block index for when intra-slot frequency hopping is applied,
   wherein the terminal determines a pattern of the frequency hopping of the uplink control channel over each of the plurality of slots, regardless of whether or not the uplink control channel is being transmitted in a slot among the plurality of slots, even when the uplink control channel is not being transmitted in the slot among the plurality of slots,
   wherein the information regarding the first physical resource block index is information regarding a physical resource block index of a PUCCH, and the information regarding the second-hop physical resource block index is information regarding a physical resource block index of the PUCCH, and
   wherein the information regarding the first physical resource block index and the information regarding the second-hop physical resource block index are indicated by using a field in downlink control information from one or more parameters configured by higher layer signaling.

4. A radio communication system comprising:
a terminal; and
a base station,
wherein the terminal comprises:
    a transmitter that transmits an uplink control channel over a plurality of slots; and
    a processor that controls frequency hopping of the uplink control channel over the plurality of slots based on information regarding a first physical resource block index and information regarding a second-hop physical resource block index that are respectively the same as information regarding a first physical resource block index and information regarding a second-hop physical resource block index for when intra-slot frequency hopping is applied;
    wherein the processor determines a pattern of the frequency hopping of the uplink control channel over each of the plurality of slots, regardless of whether or not the uplink control channel is being transmitted in a slot among the plurality of slots, even when the uplink control channel is not being transmitted in the slot among the plurality of slots,
    wherein the information regarding the first physical resource block index is information regarding a physical resource block index of a PUCCH, and the information regarding the second-hop physical resource block index is information regarding a physical resource block index of the PUCCH, and
    wherein the information regarding the first physical resource block index and the information regarding the second-hop physical resource block index are indicated by using a field in downlink control information from one or more parameters configured by higher layer signaling; and
wherein the base station comprises a receiver that receives the uplink control channel over a plurality of slots.

* * * * *